US012684240B2

(12) United States Patent     (10) Patent No.:   US 12,684,240 B2

Imaizumi                    (45) Date of Patent:     Jul. 14, 2026

(54) CONTROL DEVICE AND CONTROL METHOD

(71) Applicant: CANON KABUSHIKI KAISHA, Tokyo (JP)

(72) Inventor: Tsubasa Imaizumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 18/826,936

(22) Filed: Sep. 6, 2024

(65) Prior Publication Data

US 2025/0106513 A1     Mar. 27, 2025

(30) Foreign Application Priority Data

Sep. 22, 2023    (JP) ................................. 2023-158241

(51) Int. Cl.
   *H04N 23/66*        (2023.01)
   *H04N 23/611*      (2023.01)
   *H04N 23/695*      (2023.01)

(52) U.S. Cl.
   CPC ......... *H04N 23/695* (2023.01); *H04N 23/611* (2023.01); *H04N 23/66* (2023.01)

(58) Field of Classification Search
   None
   See application file for complete search history.

(56) References Cited

U.S. PATENT DOCUMENTS

2023/0123474 A1 *   4/2023   Ding ...................... H04N 23/54
                                          348/374
2023/0368458 A1 *   11/2023   Dryer .................. G06F 3/04815

FOREIGN PATENT DOCUMENTS

JP       2003348428 A     12/2003
JP       2020025248 A     2/2020

* cited by examiner

*Primary Examiner* — Eileen M Adams
(74) *Attorney, Agent, or Firm* — Cowan, Liebowitz & Latman, P.C.

(57)             ABSTRACT

A control device includes: a processor; and a memory storing a program which, when executed by the processor, causes the control device to: control a shooting direction of a plurality of second image-capturing devices so as to face a shooting object corresponding to the shooting object of the first image-capturing device, wherein in a case in which a shooting direction of the first image-capturing device is changed from a direction facing a first object to a direction facing a second object, a shooting direction of second image-capturing devices included in a first group is not changed from a direction facing a third object corresponding to the first object, and a shooting direction of second image-capturing devices included in a second group is changed from the direction facing the third object, to a direction facing a fourth object corresponding to the second object.

18 Claims, 12 Drawing Sheets

*FIG. 5*

| PATTERN | OBJECT BEFORE CHANGING | | OBJECT AFTER CHANGING | |
|---|---|---|---|---|
| | MAIN CAMERA | SUB-CAMERA | MAIN CAMERA | SUB-CAMERA |
| 1 | OBJECT A | OBJECT A | OBJECT B | OBJECT B |
| 2 | OBJECT A | OBJECT A | OBJECT B | OBJECT C |
| 3 | OBJECT A | OBJECT B | OBJECT C | OBJECT C |
| 4 | OBJECT A | OBJECT B | OBJECT B | OBJECT A |
| 5 | OBJECT A | OBJECT B | OBJECT C | OBJECT D |
| 6 | OBJECT A | OBJECT B | OBJECT B | OBJECT C |
| 7 | OBJECT A | OBJECT B | OBJECT C | OBJECT A |
| ... | ... | ... | ... | ... |

FIG. 8A
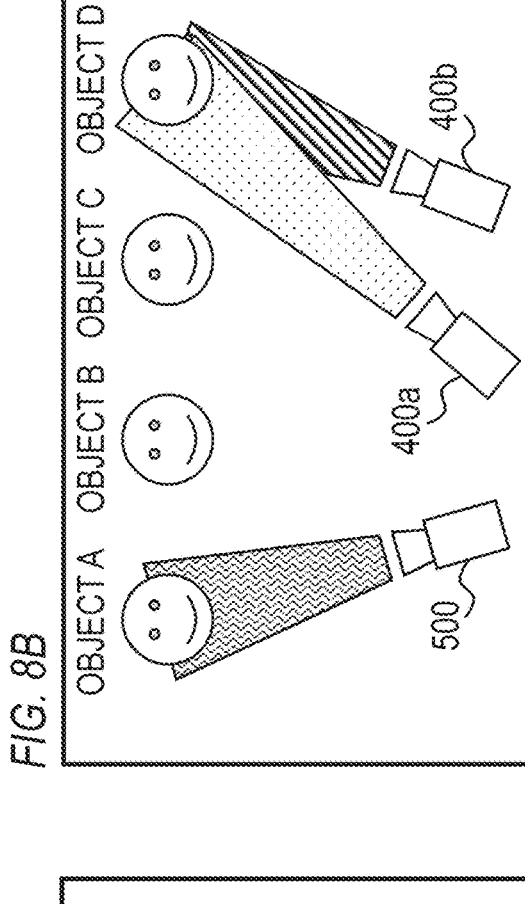
FIG. 8B
FIG. 8C
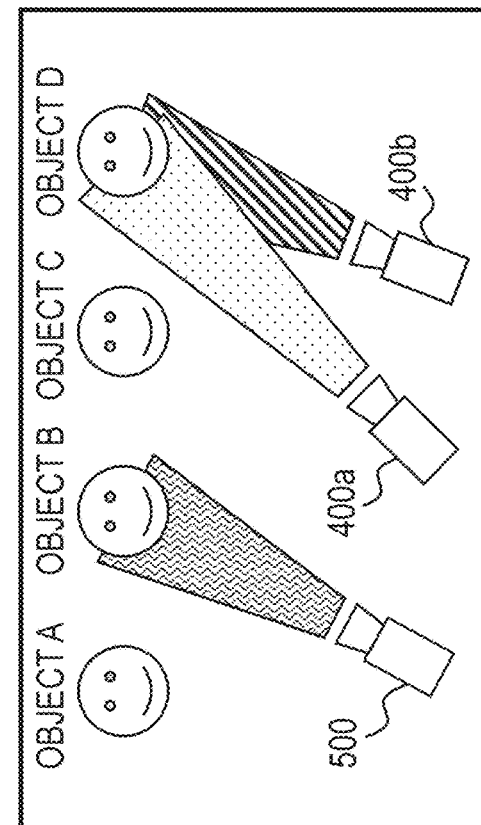
FIG. 8D
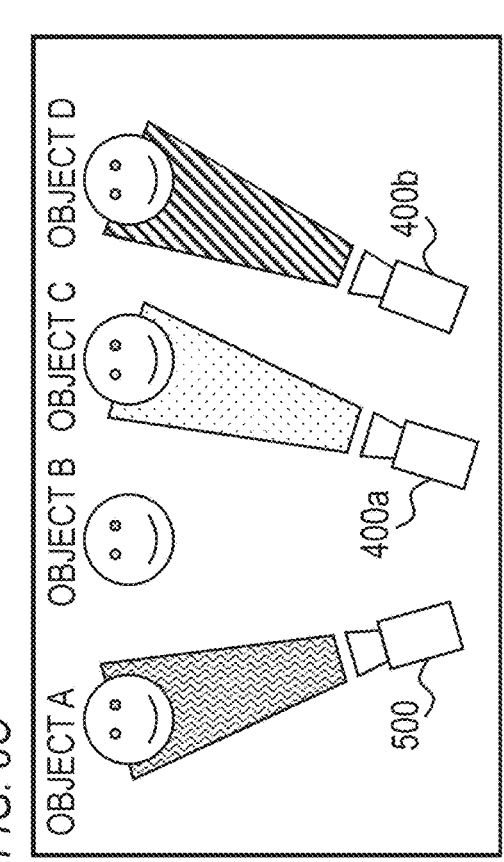

HORIZONTAL
DIRECTION

TRACKING OBJECT
OBJECT_ID

CENTER OF
OPTICAL AXIS (px, py)

θ

400

(subx, suby)

VERTICAL
DIRECTION

TRACKING OBJECT
OBJECT_ID

400

ρ h2 h1

L

CONTROL DEVICE AND CONTROL METHOD

BACKGROUND OF THE INVENTION

Field of the Invention

The present invention relates to a control device that controls shooting by a plurality of cameras, and a control method.

Description of the Related Art

As of recent, there is known a system that performs shooting using a plurality of cameras. Out of the plurality of cameras, a main camera, and a plurality of sub-cameras that differ from the main camera, are laid out, thereby enabling a plurality of shooting angles of view to be obtained. In shooting by a plurality of cameras, laborsaving for camera-men performing shooting using the cameras is desired, in order to reduce shooting costs.

In order to realize laborsaving, a camera called a PTZ camera, of which panning, tilting, and zooming can be remotely adjusted, can be used. PTZ cameras can automatically control panning, tilting, and zooming such that a tracking object is located at a desired position within the angle of view of the camera, using technology for automatically tracking the tracking object that has been detected in shot images.

Japanese Patent Application Publication No. 2003-348428 discloses technology for deciding a shooting direction of another camera that differs from a parent camera, on the basis of a position of a object being shot by the parent camera, as technology relating to automatic control of a plurality of cameras.

Also, Japanese Patent Application Publication No. 2020-025248 discloses technology for transmitting object information at a main image-capturing device to a sub-image-capturing device, and performing automatic shooting by the sub-image-capturing device on the basis of the object information.

However, when the object is changed at the main camera, and orientations of the cameras are being changed, there is a possibility images containing a desired object may not be obtainable. For example, in shooting of live performances and so forth, while shooting directions of a plurality of sub-cameras are being changed in accordance with the object being changed at the main camera, the images at each of the sub-cameras are images in transit, and accordingly there is a possibility that a user does not obtain desired images.

SUMMARY OF THE INVENTION

The present invention provides a control device that enables control such that desired images can be obtained when changing objects in shooting by a plurality of cameras.

A control device according to the present invention includes: a processor; and a memory storing a program which, when executed by the processor, causes the control device to: execute acquisition processing of acquiring information indicating a shooting object of a first image-capturing device; and execute control processing of controlling a shooting direction of a plurality of second image-capturing devices so as to face a shooting object corresponding to the shooting object of the first image-capturing device, wherein in the control processing, in a case in which a shooting direction of the first image-capturing device is changed from a direction facing a first object to a direction facing a second object, a shooting direction of second image-capturing devices included in a first group, out of the plurality of the second image-capturing devices, is not changed from a direction facing a third object corresponding to the first object, and a shooting direction of second image-capturing devices included in a second group, out of the plurality of the second image-capturing devices, is changed from the direction facing the third object, to a direction facing a fourth object corresponding to the second object.

Further features of the present invention will become apparent from the following description of exemplary embodiments with reference to the attached drawings.

BRIEF DESCRIPTION OF THE DRAWINGS

FIG. 5 is a diagram for describing role information;

FIGS. 8A to 8D are diagrams illustrating a specific example of changing shooting objects of sub-cameras;

DESCRIPTION OF THE EMBODIMENTS

Embodiment

Figure 1:
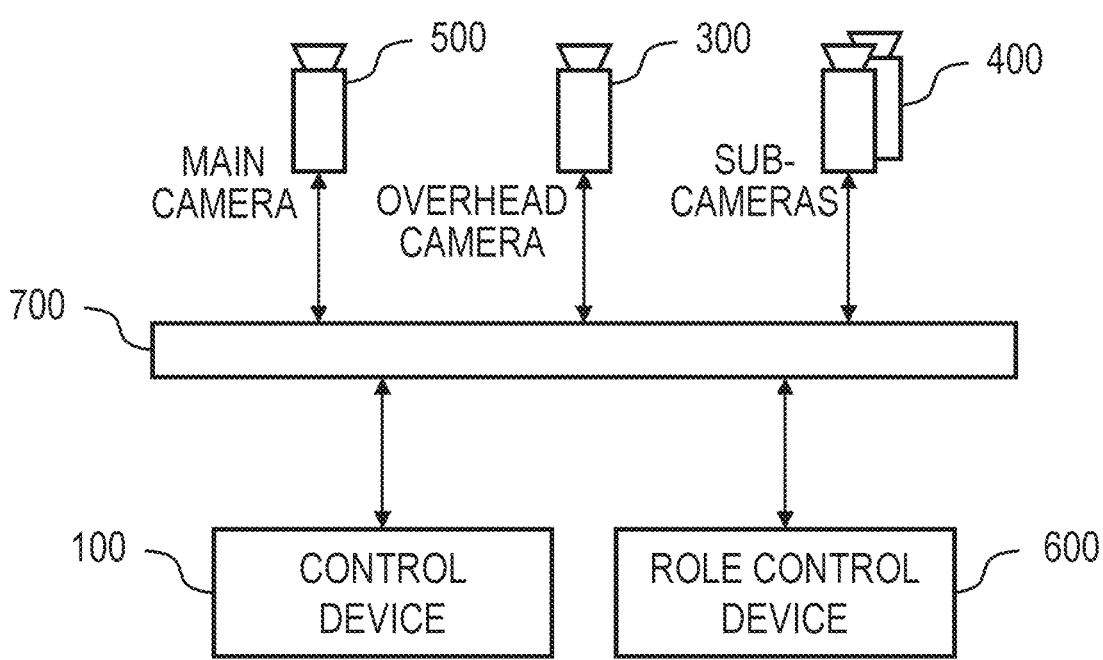
FIG. 1 is a diagram exemplifying a configuration of a shooting system.

A shooting system according to an embodiment of the present invention will be described below with reference to the drawings. FIG. 1 is a diagram exemplifying a configuration of the shooting system. The shooting system includes a control device 100, an overhead camera 300, a plurality of sub-cameras 400, a main camera 500, and a role control device 600. The configurations in the shooting system are connected via a local area network (LAN) 700 for example, and the devices are each communicable with each other.

The overhead camera 300 and the main camera 500 transmit images shot of objects to the control device 100 via a video cable (omitted from illustration). The overhead camera 300 and the main camera 500 also transmit shooting information to the control device 100 via the LAN 700. The overhead camera 300 is a camera that shoots over a wide-angle angle of view, so as to be capable of shooting the shooting environment from a bird's eye view. The overhead camera 300 may be a PTZ camera. The main camera 500 is a camera that a user manually operates to perform shooting, or a PTZ camera. The sub-cameras 400 are PTZ cameras that operate in cooperation with the main camera 500, and are driven on the basis of pan, tilt, and zoom values calculated by the control device 100. The shooting system includes a plurality of the sub-cameras 400.

The control device 100 controls a shooting direction of the plurality of sub-cameras 400 so as to face toward a shooting object corresponding to a shooting object of the main camera 500. The control device 100 uses role information set by the role control device 600 and information acquired from shot images of the overhead camera 300 and the main camera 500 to calculate the pan, tilt, and zoom values for driving the sub-cameras 400.

The role information is information regarding objects of the sub-cameras 400 corresponding to objects that are shooting objects of shooting by the main camera 500. The role information may include information regarding whether cameras included in the shooting system are the main camera 500 or the sub-cameras 400. Information acquired from shot images from the overhead camera 300 includes position information of the main camera 500 and the sub-cameras 400. Information acquired from shot images from the main camera 500 includes information of objects that are shooting objects of the main camera 500. The control device 100 transmits pan, tilt, and zoom values, which are calculated, to the sub-cameras 400. The control device 100 is a workstation, an edge artificial intelligence (AI) device, or the like.

The role control device 600 sets roles for the sub-cameras 400 that are controlled in cooperation with operations of the main camera 500. The role control device 600 sets the roles with respect to which objects will be the shooting objects of the sub-cameras 400, in accordance with the objects that are the shooting objects of the main camera 500. The role control device 600 can, for example, set the roles of the sub-cameras 400 in accordance with instructions from the user. The role control device 600 is electronic equipment such as a laptop personal computer (PC), a switch controller (equipment in which macros can be assigned to buttons), or the like. The user can set the roles of the sub-cameras 400 via a user interface (UI) of the laptop PC, by button operations of the switch controller, or the like.

Configurations of the control device 100, the overhead camera 300, the sub-cameras 400, the main camera 500, and the role control device 600 will be described in detail with reference to FIGS. 2A, 2B and FIGS. 3A to 3C.

Figure 2A:
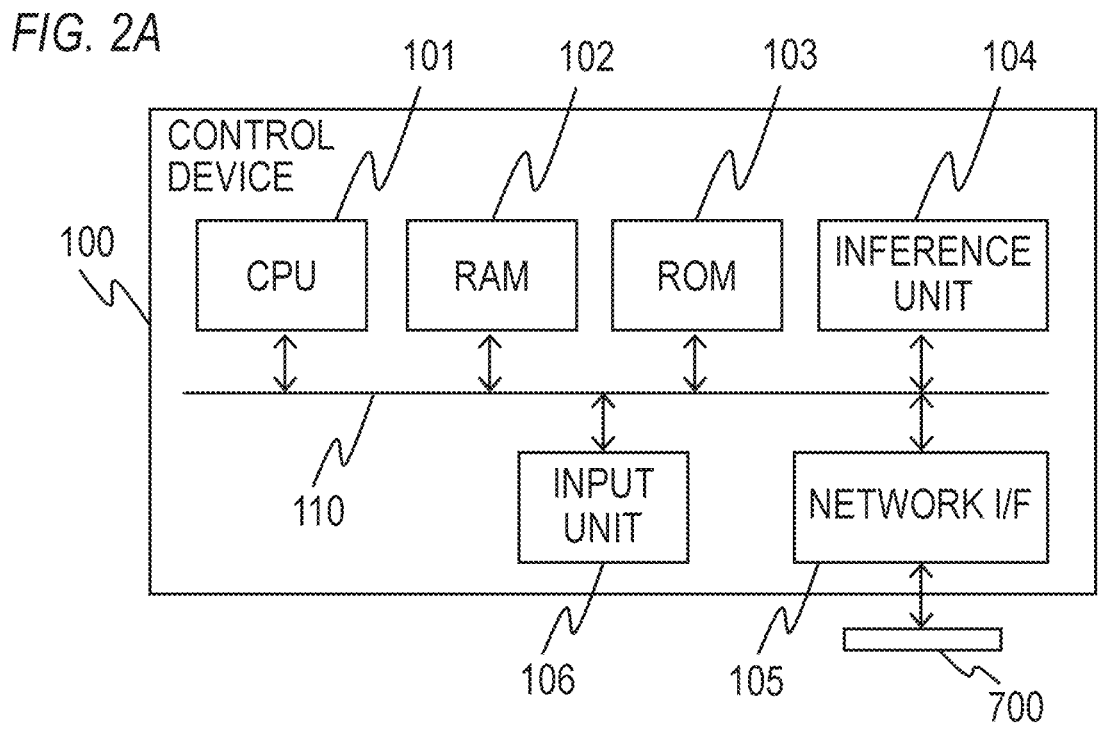
FIG. 2A is a diagram illustrating a configuration example of a control device.

FIG. 2A is a diagram illustrating a configuration example of the control device 100. The control device 100 includes a central processing unit (CPU) 101, random access memory (RAM) 102, and read-only memory (ROM) 103. Also, the control device 100 includes an inference unit 104, a network interface (I/F) 105, and an input unit 106. Configurations included in the control device 100 are mutually connected via an internal bus 110.

The CPU 101 controls the overall control device 100. The RAM 102 is a high-speed storage device such as dynamic condom access memory (DRAM) or the like. The CPU 101 temporarily loads an operating system (OS), various types of programs, and various types of data, to the RAM 102, and executes various types of processing. The RAM 102 is also used as a work area for the CPU 101 to execute the OS and various types of programs.

The ROM 103 is a nonvolatile storage device such as flash memory, a hard disk drive (HDD), a solid-state drive (SSD), a Secure Digital (SD) card, or the like. The ROM 103 is used as a permanent storage region for the OS, various types of programs, and various types of data, and is used as a short-term storage region for various types of data as well.

The inference unit 104 reads out shot images that have been shot by the overhead camera 300, the sub-cameras 400, and the main camera 500, from the RAM 102, and estimates position and presence of objects such as cameras, objects, and so forth, from the shot images that are read out. The inference unit 104 is a computing device specialized in image processing and inference processing, such as a graphics processing unit (GPU) or the like, for example. GPUs are effective as computing devices to be used for learning processing. Note that the inference unit 104 may be a reconstructable logic circuit such as a field-programmable gate array (FPGA). Also, processing of the inference unit 104 may be realized by the CPU 101.

The network I/F 105 is an interface for connecting to the LAN 700, and controls communication with external devices such as the sub-cameras 400 and so forth, via a communication medium such as Ethernet (registered trademark) or the like. Note that the network I/F 105 may be a serial communication interface or the like.

Figure 2B:
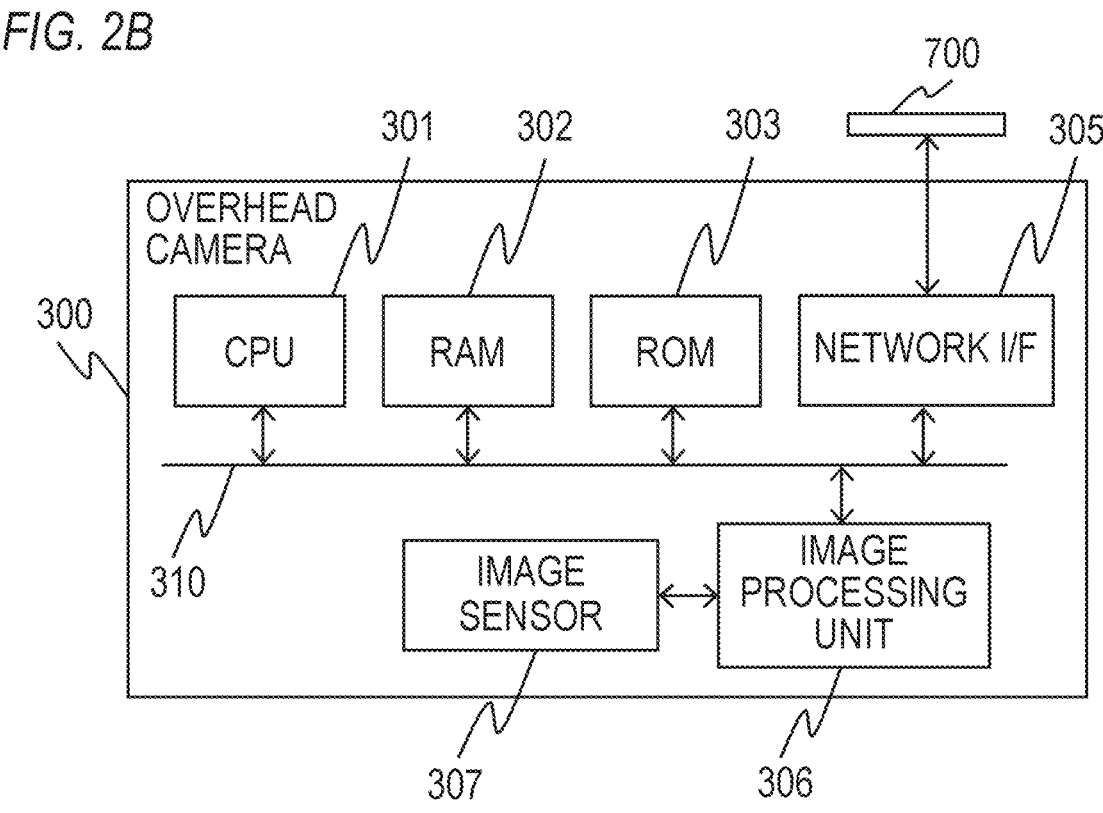
FIG. 2B is a diagram illustrating a configuration example of an overhead camera.

FIG. 2B is a diagram illustrating a configuration example of the overhead camera 300. The overhead camera 300 includes a CPU 301, RAM 302, ROM 303, a network I/F 305, an image processing unit 306, and an image sensor 307. Configurations included in the overhead camera 300 are mutually connected via an internal bus 310.

The CPU 301 controls the overall overhead camera 300. The RAM 302 is a high-speed storage device such as DRAM or the like. The CPU 301 temporarily loads an OS, various types of programs, and various types of data, to the RAM 302, and executes various types of processing. The RAM 302 is also used as a work area for the CPU 301 to execute the OS and various types of programs.

The ROM 303 is a nonvolatile storage device such as flash memory, HDD, SSD, SD card, or the like. The ROM 303 is used as a permanent storage region for the OS, various types of programs, and various types of data, and is used as a short-term storage region for various types of data as well.

The image processing unit 306 is connected to the image sensor 307 such as a charge-coupled device (CCD), a complementary metal-oxide semiconductor (CMOS), or the like. The image processing unit 306 converts image data acquired from the image sensor 307 into a predetermined format, and performs transfer thereof to the RAM 302. The image processing unit 306 may compress post-conversion image data and perform transfer thereof to the RAM 302.

At the time of acquiring images from the image sensor 307, the image processing unit 306 may subject the images to image processing such as color correction, exposure control, sharpness correction, and so forth. Also, the image processing unit 306 may perform cropping processing, in which a portion of the image data is clipped out. Processing by the image processing unit 306 may be executed on the basis of instructions received from an external device such as the control device 100 or the like via the network I/F 305.

The network I/F 305 is an interface for connecting to the LAN 700, and controls communication with external devices such as the control device 100 and so forth, via a communication medium such as Ethernet (registered trademark) or the like. Note that the network I/F 305 may be a serial communication interface or the like.

5

6

Figure 3A:
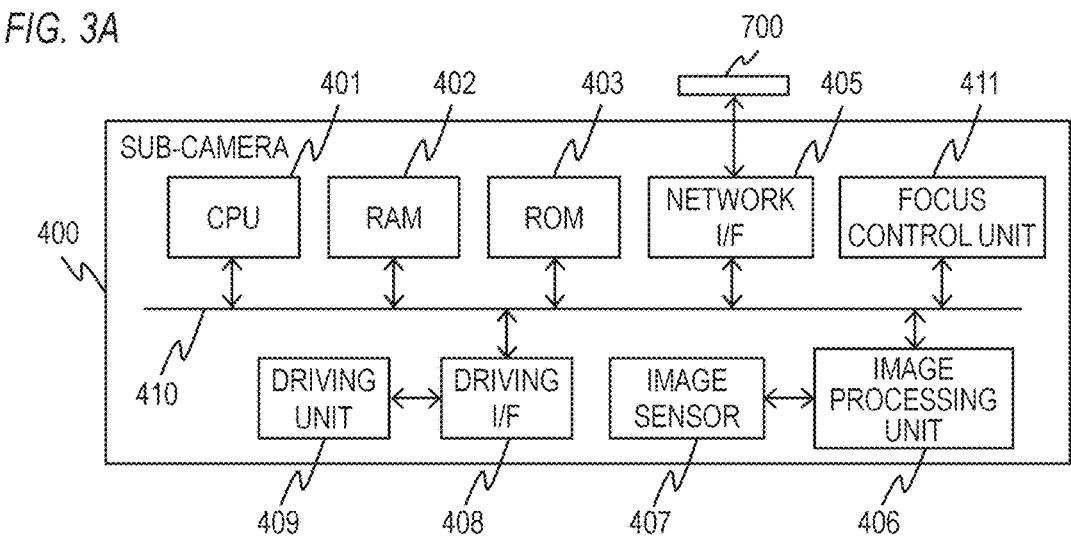
FIG. 3A is a diagram illustrating a configuration example of a sub-camera.

The shooting system includes the plurality of sub-cameras 400, and the main camera 500 performs shooting in cooperation with the plurality of sub-cameras 400. FIG. 3A is a diagram illustrating a configuration example of the sub-camera 400. Each of the plurality of sub-cameras 400 included in the shooting system has the same configuration as the configuration illustrated in FIG. 3A. The sub-camera 400 includes a CPU 401, RAM 402, ROM 403, a network I/F 405, an image processing unit 406, an image sensor 407, a driving I/F 408, a driving unit 409, and a focus control unit 411. Configurations included in the sub-camera 400 are mutually connected via an internal bus 410.

The CPU 401 controls the overall sub-camera 400. The RAM 402 is a high-speed storage device such as DRAM or the like. The CPU 401 temporarily loads an OS, various types of programs, and various types of data, to the RAM 402, and executes various types of processing. The RAM 402 is also used as a work area for the CPU 401 to execute the OS and various types of programs.

The ROM 403 is a nonvolatile storage device such as flash memory, HDD, SSD, SD card, or the like. The ROM 403 is used as a permanent storage region for the OS, various types of programs, and various types of data, and is used as a short-term storage region for various types of data as well.

The image processing unit 406 is connected to the image sensor 407 such as a CCD, a CMOS, or the like. The image processing unit 406 converts image data acquired from the image sensor 407 into a predetermined format, and performs transfer thereof to the RAM 402. The image processing unit 406 may compress post-conversion image data and perform transfer thereof to the RAM 402.

At the time of acquiring images from the image sensor 407, the image processing unit 406 may object the images to image processing such as color correction, exposure control, sharpness correction, and so forth. Also, the image processing unit 406 may perform cropping processing, in which a portion of the image data is clipped out. Processing by the image processing unit 406 may be executed on the basis of instructions received from an external device such as the control device 100 or the like via the network I/F 405.

The network I/F 405 is an interface for connecting to the LAN 700, and controls communication with external devices such as the control device 100 and so forth, via a communication medium such as Ethernet (registered trademark) or the like. Note that the network I/F 405 may be a serial communication interface or the like.

The driving I/F 408 is a unit for connecting to the driving unit 409, and exchanges control signals and so forth with the driving unit 409. The driving unit 409 is a turning mechanism for changing the shooting direction of the sub-camera 400, and includes a mechanical driving system, a motor that is a driving source, and so forth. The driving unit 409 performs driving for turning, such as panning operations in which a shooting angle of view is changed in a horizontal direction and tilting operations in which the shooting angle of view is changed in a vertical direction, and zooming operations in which the shooting angle of view is optically changed, on the basis of instructions received from the CPU 401 via the driving I/F 408.

The focus control unit 411 controls focusing at the time of the image sensor 407 acquiring shot images. Known technology such as contrast detection, phase-difference detection, and so forth can be used as techniques for focusing.

Figure 3B:
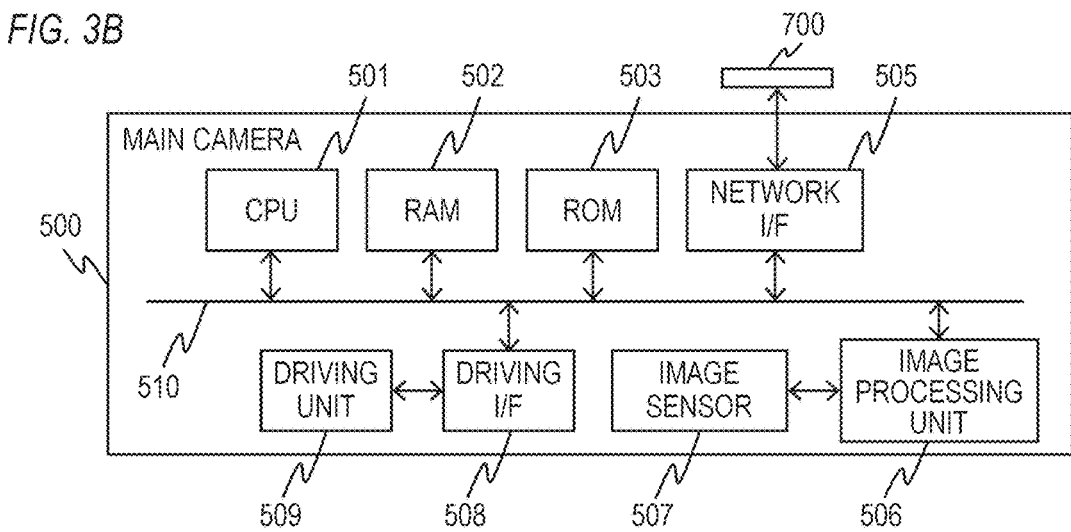
FIG. 3B is a diagram illustrating a configuration example of a main camera.

FIG. 3B is a diagram illustrating a configuration example of the main camera 500. In the following description, the main camera 500 is assumed to be manually operated by the user. Specifically, the user can use a camera control controller that is omitted from illustration to perform PTZ control of the main camera 500. The main camera 500 is not limited to being a PTZ camera, and may be a camera of a configuration in which shot images are obtained by being physically and manually moved by the user.

The control device 100 can acquire orientation information of the main camera 500 (angles of panning and tilting with reference to a straight-forward-facing installation orientation) over the LAN 700 via a network I/F 505.

The main camera 500 includes a CPU 501, RAM 502, ROM 503, the network I/F 505, an image processing unit 506, an image sensor 507, a driving I/F 508, and a driving unit 509. Configurations included in the main camera 500 are mutually connected via an internal bus 510.

The CPU 501 controls the overall main camera 500. The RAM 502 is a high-speed storage device such as DRAM or the like. The CPU 501 temporarily loads an OS, various types of programs, and various types of data, to the RAM 502, and executes various types of processing. The RAM 502 is also used as a work area for the CPU 501 to execute the OS and various types of programs.

The ROM 503 is a nonvolatile storage device such as flash memory, HDD, SSD, SD card, or the like. The ROM 503 is used as a permanent storage region for the OS, various types of programs, and various types of data, and is used as a short-term storage region for various types of data as well.

The image processing unit 506 is connected to the image sensor 507 such as a CCD, a CMOS, or the like. The image processing unit 506 converts image data acquired from the image sensor 507 into a predetermined format, and performs transfer thereof to the RAM 502. The image processing unit 506 may compress post-conversion image data and perform transfer thereof to the RAM 502.

At the time of acquiring images from the image sensor 507, the image processing unit 506 can object the images to image processing such as color correction, exposure control, sharpness correction, and so forth. Also, the image processing unit 506 may perform cropping processing, in which a portion of the image data is clipped out. Processing by the image processing unit 506 may be executed on the basis of instructions received from an external device such as the control device 100 or the like via the network I/F 505.

The network I/F 505 is an interface for connecting to the LAN 700, and controls communication with external devices such as the control device 100 and so forth, via a communication medium such as Ethernet (registered trademark) or the like. Note that the network I/F 505 may be a serial communication interface or the like.

The driving I/F 508 is a unit for connecting to the driving unit 509, and exchanges control signals and so forth with the driving unit 509. The driving unit 509 is a turning mechanism for changing the shooting direction of the main camera 500, and includes a mechanical driving system, a motor that is a driving source, and so forth. The driving unit 509 performs driving for turning, such as panning operations in which the shooting angle of view is changed in the horizontal direction and tilting operations in which the shooting angle of view is changed in the vertical direction, and zooming operations in which the shooting angle of view is optically changed, on the basis of instructions received from the CPU 501 via the driving I/F 508.

Figure 3C:
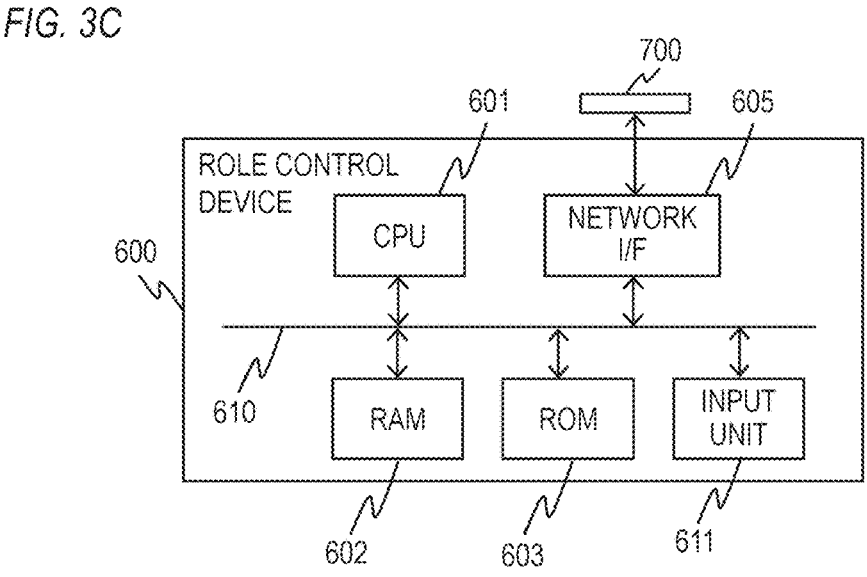
FIG. 3C is a diagram illustrating a configuration example of a role control device.

FIG. 3C is a diagram illustrating a configuration example of the role control device 600. The role control device 600 includes a CPU 601, RAM 602, ROM 603, a network I/F 605, and an input unit 611. Configurations included in the role control device 600 are mutually connected via an internal bus 610.

The CPU 601 controls the overall role control device 600. The RAM 602 is a high-speed storage device such as DRAM or the like. The CPU 601 temporarily loads an OS, various types of programs, and various types of data, to the RAM 602, and executes various types of processing. The RAM 602 is also used as a work area for the CPU 601 to execute the OS and various types of programs.

The ROM 603 is a nonvolatile storage device such as flash memory, HDD, SSD, SD card, or the like. The ROM 603 is used as a permanent storage region for the OS, various types of programs, and various types of data, and is used as a short-term storage region for various types of data as well.

The network I/F 605 is an interface for connecting to the LAN 700, and controls communication with external devices such as the control device 100 and so forth, via a communication medium such as Ethernet (registered trademark) or the like. Note that the network I/F 605 may be a serial communication interface or the like.

The input unit 611 includes operating members such as buttons, a mouse, a keyboard, and so forth. The user can input role information by controlling a graphical user interface (GUI) using the operating members. The CPU 601 transmits the role information specified by the user to the control device 100. Note that the role control device 600 may be configured as an integral device with the control device 100.

Specific processing of the control device 100 will be described with reference to FIG. 4. The control device 100 calculates the pan, tilt, and zoom values of each of the plurality of sub-cameras 400 so as to face toward the shooting object corresponding to the shooting object of the main camera 500, and controls the shooting direction of each of the sub-cameras 400. In the example in FIG. 4, the plurality of the sub-cameras 400 are a sub-camera 400a and a sub-camera 400b, which may be collectively referred to as "sub-camera 400".

Figure 4:
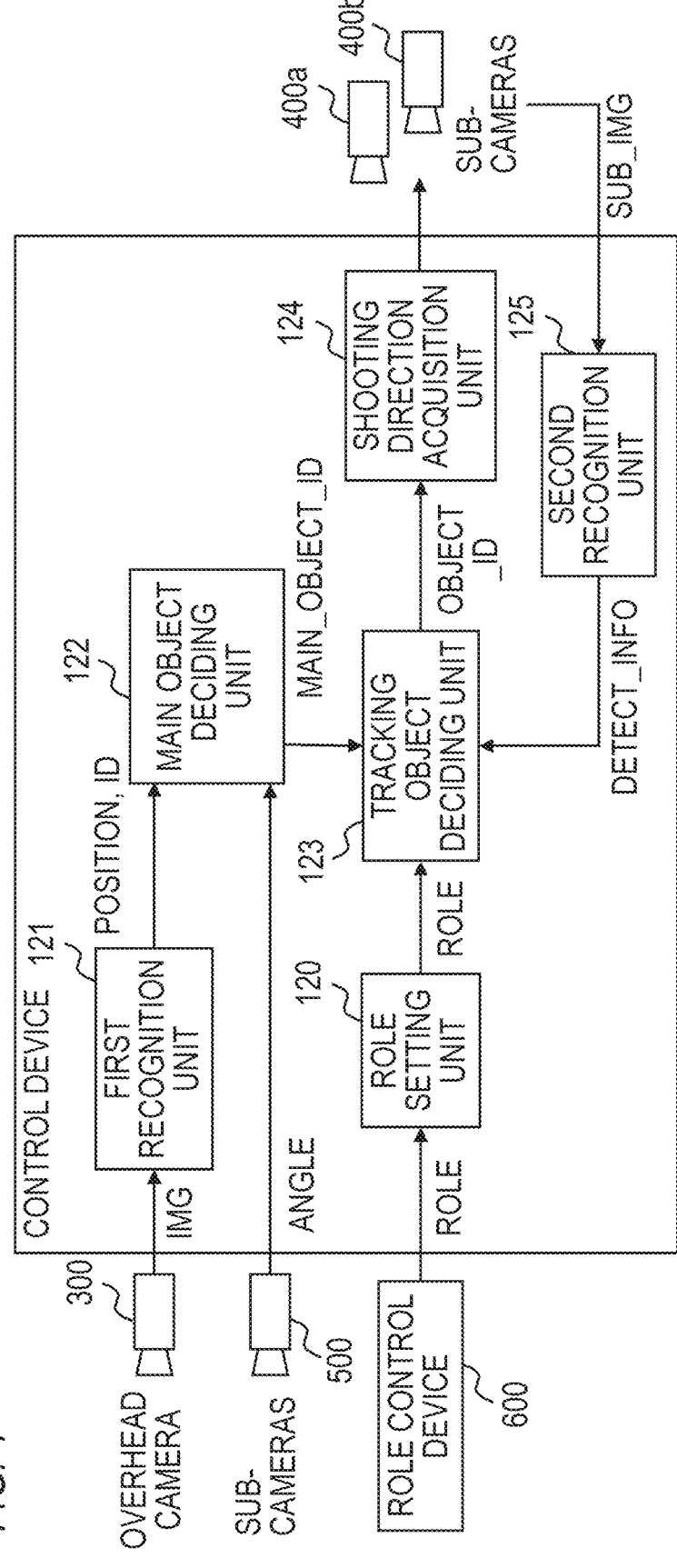
FIG. 4 is a block diagram exemplifying a functional configuration of the control device.

FIG. 4 is a block diagram exemplifying a functional configuration of the control device 100. Processing of each of the functional units of the control device 100 is realized using hardware resources illustrated in FIG. 2A. Detailed description of processing performed by general-purpose software, such as software for controlling communication functions, operating systems, and so forth, will be omitted.

The control device 100 includes a role setting unit 120, a first recognition unit 121, a main object deciding unit 122, a tracking object deciding unit 123, a shooting direction acquisition unit 124, and a second recognition unit 125. Programs for realizing the processing of each of the function units are stored in the ROM 103. The CPU 101 can realize the processing of each of the function units by reading the programs stored in the ROM 103 to the RAM 102 and performing execution thereof.

The role setting unit 120 sets the shooting object for the sub-cameras 400 on the basis of the role information set by the role control device 600. The role information includes information of the shooting object (tracking object) of the sub-camera 400 that corresponds to the shooting object (main object) of the main camera 500.

The user can set the role information via the input unit 611 of the role control device 600. Specifically, the user operates the GUI of the role control device 600 by operating the operating members such as a keyboard or the like, thereby setting the shooting object of the main camera 500, and the shooting object of the sub-cameras 400 corresponding to the shooting object of the main camera 500.

FIG. 5 is a diagram for describing role information. The user can register a plurality of patterns of role information in advance, such as shown in FIG. 5, in the role control device 600. For example, in pattern 1, the shooting object of the sub-camera 400 that corresponds to a object A which is the shooting object of the main camera 500 before changing, is the object A. Also, the shooting object of the sub-camera 400 that corresponds to a object B which is the shooting object of the main camera 500 after changing, is the object B. Pattern 1 is a pattern in which the object of the main camera 500 and the object of the sub-camera 400 are the same.

In contrast, in pattern 5, the shooting object of the sub-camera 400 that corresponds to the object A which is the shooting object of the main camera 500 before changing, is the object B. Also, the shooting object of the sub-camera 400 that corresponds to a object C which is the shooting object of the main camera 500 after changing, is a object D. Pattern 5 is a pattern in which the object of the main camera 500 and the object of the sub-camera 400 are different.

Also, the object of the main camera 500 before changing and the object of the sub-camera 400 before changing may be the same object, as in pattern 1 and pattern 2. The object of the main camera 500 before changing and the object of the sub-camera 400 after changing may be the same object, as in pattern 4 and pattern 7. The object of the main camera 500 after changing and the object of the sub-camera 400 before changing may be the same object, as in pattern 4 and pattern 6. The object of the main camera 500 after changing and the object of the sub-camera 400 after changing may be the same object, as in pattern 1 and pattern 3.

The object of the main camera 500 before changing and the object of the sub-camera 400 before changing may be different objects, as in pattern 3 to pattern 7. The object of the main camera 500 after changing and the object of the sub-camera 400 after changing may be different objects, as in pattern 2 and pattern 4 to pattern 7.

The role control device 600 transmits role information ROLE that the user has specified out of the plurality of patterns exemplified in FIG. 5 to the role setting unit 120 of the control device 100. The role setting unit 120 sets a correlative relation between the shooting object of the main camera 500 and the shooting object of the sub-camera 400 on the basis of the role information ROLE received from the role control device 600. The role setting unit 120 transmits the role information ROLE that is set to the tracking object deciding unit 123.

Note that in a case in which the user specifies patterns that do not both hold, such as pattern 1 and pattern 2, the role setting unit 120 can set the shooting object of the sub-camera 400 on the basis of the pattern registered later. Also, in a case that is not included in a pattern specified by the user, such as a case in which the object of the main camera 500 is changed from the object A to the object D, the role setting unit 120 may, for example, set the shooting object of the sub-camera 400 to the same shooting object as the main camera 500.

The first recognition unit 121 reads out a shot image IMG of the overhead camera 300, and reference position information REF_POSI including information of installation positions of the cameras and information of marker coordinates, from the RAM 102. The first recognition unit 121 detects a person (object) that is the shooting object using the information read out from the RAM 102, and acquires position information POSITION of the object that is detected. In a case in which a plurality of objects are detected, the position information POSITION includes position information of each object. The first recognition unit 121 outputs the position information POSITION of the objects that are detected, and identification information ID of each object.

The installation position of each camera can be measured manually, or by using a sensor that is omitted from illustration, as the position of the camera in a planar coordinate system when viewing a shooting region from directly above. Information of the installation position of each camera that is measured is input to the control device 100 via the input unit 106, by the user for example. The CPU 101 writes the information of the installation position of each camera that is input to the RAM 102. Also, the information of the installation position of each camera that is measured may be transmitted from the sensor to the control device 100, and written to the RAM 102 by the CPU 101.

Markers are set at positions that are visually recognizable when viewing the shooting region from directly above, in order to calculate a homography transform matrix that is used in coordinate transformation. Marker coordinates in a coordinate system of the shooting region can be measured manually, or by using a sensor that is omitted from illustration. Markers are marks or the like of a color that is different from that of the floor, ground, or the like, but may be of any form as long as manual measurement or measurement by sensor can be performed. In a case in which the sensor for measuring the markers is a camera, placing marks with a particular color as markers enables the camera to extract the color of the marker from image-captured images of the shooting region, and acquire marker coordinates. Information of marker coordinates is input to the control device 100 via the input unit 106, by the user for example. The CPU 101 writes the information of the marker coordinates that is input to the RAM 102. Also, the information of the marker coordinates that is measured may be transmitted from the sensor to the control device 100, and written to the RAM 102 by the CPU 101.

The reference position information REF_POSI and the position information POSITION of objects are expressed in coordinates of the planar coordinate system when viewing the shooting region from directly above. In a case of detecting three people that are objects, for example, the first recognition unit 121 outputs the position information POSITION and the identification information ID for the three people. The first recognition unit 121 writes the information that is output to the RAM 102.

Figure 6A:
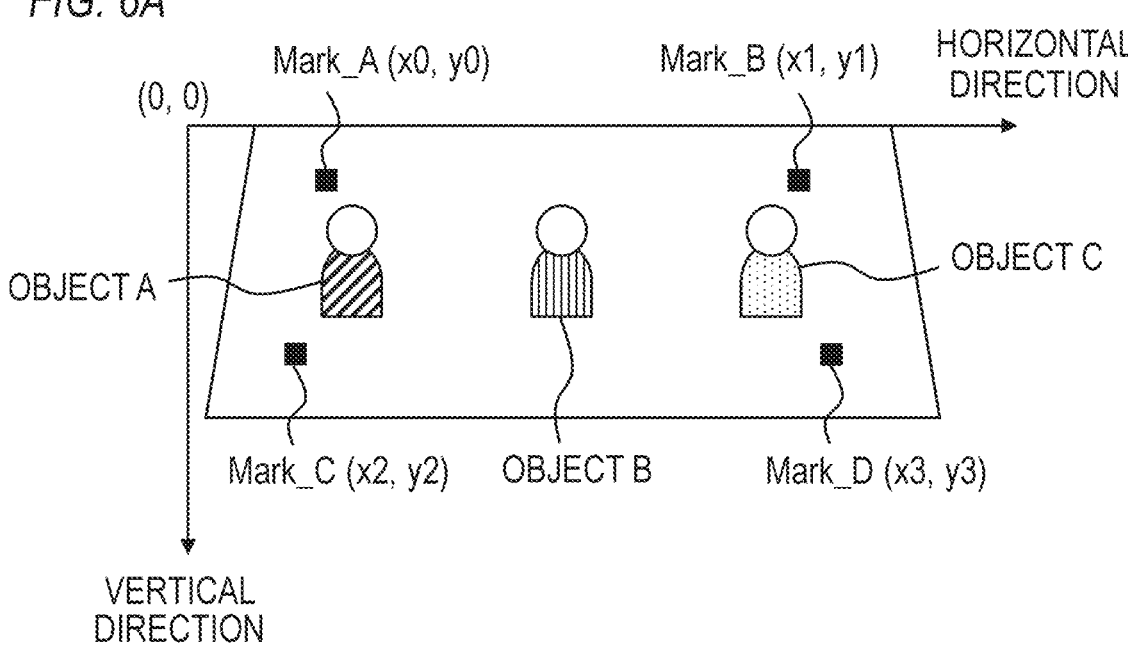
FIGS. 6A and 6B are diagrams for describing conversion of coordinate systems.
Figure 6B:
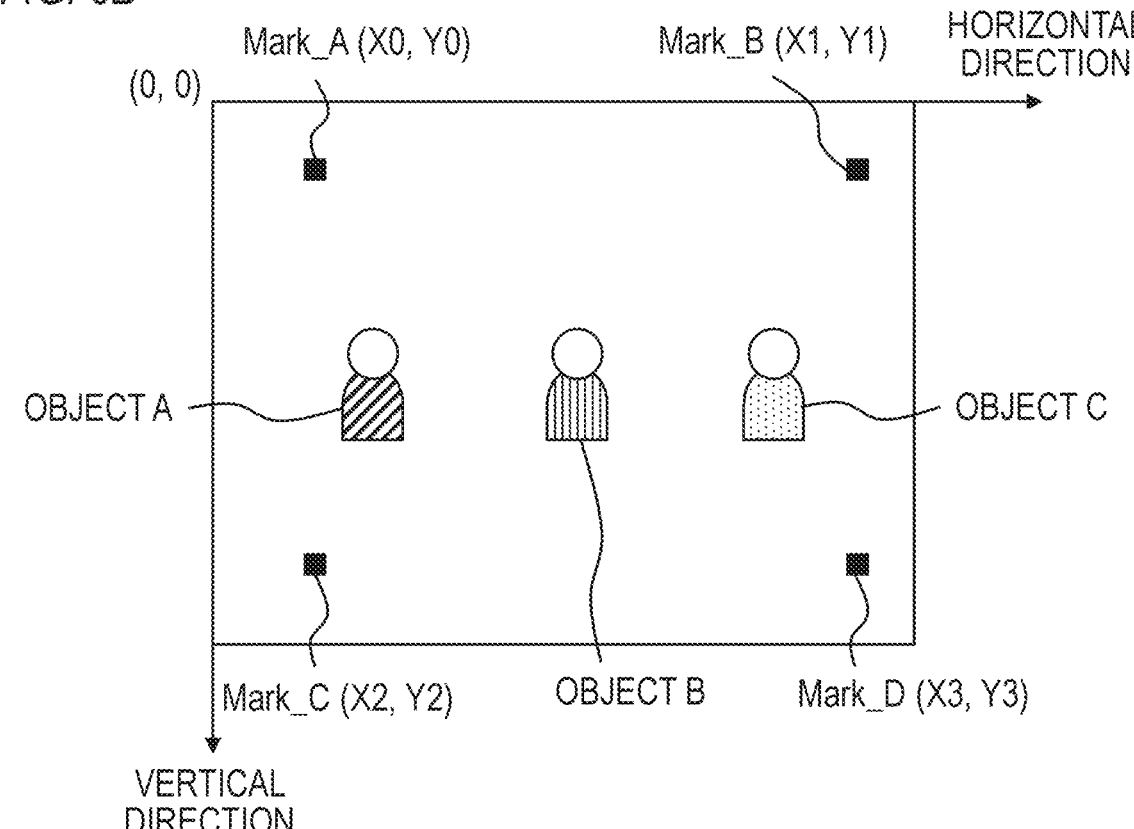

A method of detecting positions of objects that are present in the shooting region, and acquiring the position information POSITION of the objects that are detected, will be described with reference to FIGS. 6A and 6B. FIG. 6A illustrates a coordinates system in a shot image of the overhead camera 300. FIG. 6B illustrates a coordinate system of the shooting region as viewed from directly above. The first recognition unit 121 acquires coordinates of the objects in the coordinate system of the shooting region viewed from directly above, as position information POSI-TION, on the basis of a relation between the coordinates system of the shot image of the overhead camera 300 and the coordinates system of the shooting region viewed from directly above.

In a case of calculating pan values in which the sub-camera 400a and the sub-camera 400b turn toward a direction of a object to be tracked, calculating with a planar coordinate system that is perpendicular to an axis of panning operations makes angle calculation easier. For example, in a case in which the sub-camera 400a and the sub-camera 400b are installed perpendicular to the floor or the ground, the coordinate plane that is perpendicular to the axis of the panning operations is parallel to the floor or the ground, and is a coordinate plane viewing the space in which the objects are present from directly above.

In the following description, the sub-camera 400a and the sub-camera 400b are installed perpendicular to the floor or the ground, and the pan values of the sub-cameras 400 are calculated with the coordinates system of the shooting region viewed from directly above. The first recognition unit 121 performs transformation of the coordinates of the objects in the coordinate system of the shot image of the overhead camera 300 illustrated in FIG. 6A (hereinafter, referred to as "overhead camera coordinate system"), into coordinates in the coordinate system of the shooting region viewed from directly above illustrated in FIG. 6B (hereinafter, referred to as "planar coordinate system"). Accordingly, the first recognition unit 121 can calculate the pan values of the sub-cameras 400 in the coordinate system of the shooting region viewed from directly above.

The coordinates of the objects in the overhead camera coordinate system is transformed into coordinates in the planar coordinate system by the following Expression 1, using homography transform matrix H.

[Math 1]

$$\begin{pmatrix} X \\ Y \\ W \end{pmatrix} = H \begin{pmatrix} x \\ y \\ 1 \end{pmatrix} \qquad \text{(Expression 1)}$$

In Expression 1, x and y are horizontal coordinates and vertical coordinates of the overhead camera coordinate system, respectively. X and Y in Expression 1 are horizontal coordinates and vertical coordinates of the planar coordinate system, respectively.

The first recognition unit 121 reads out the reference position information REF_POSI from the RAM 102. Marker coordinates of markers Mark_A to Mark_D included in the reference position information REF_POSI are the coordinates in the planar coordinate system of the shooting region viewed from directly above, and are substituted into the left side of Expression 1. Also, the first recognition unit 121 acquires marker coordinates in the overhead camera coordinate system from the shot image IMG of the overhead camera 300, and substitutes these into the right side of Expression 1. The homography transform matrix H can be found by substituting the marker coordinates in the overhead camera coordinate system and the marker coordinates in the planar coordinate system into Expression 1.

Once the homography transform matrix H is found, the first recognition unit 121 can use Expression 1 to perform mapping of the overhead camera coordinate system illustrated into FIG. 6A to the planar coordinate system illustrated in FIG. 6B. That is to say, the first recognition unit 121 can perform transformation of any coordinates in the overhead camera coordinate system into corresponding coordinates in the planar coordinate system. Accordingly, the first recognition unit 121 can comprehend the positions of the object A, the object B, and the object C, in the shot image IMG of the overhead camera 300, in the planar coordinate system of FIG. 6B. The first recognition unit 121 writes the homography transform matrix H found using the marker coordinates to the RAM 102.

A method of detecting the positions of objects from the shot image IMG input from the overhead camera 300, using an inference model for object detection, will be described with reference to FIGS. 7A and 7B. The inference model for object detection is stored in the ROM 103 in advance. In a case of detecting people, for example, as objects, the first recognition unit 121 can detect people from the shot image IMG of the overhead camera 300, using a trained person detection inference model that has been created by a machine learning technique such as deep learning or the like. The person detection inference model takes images as input, and outputs coordinates in the image of people in the image.

The first recognition unit 121 (inference unit 104) inputs the shot image IMG input from the overhead camera 300 into the person detection inference model, and detects people present in the image. In FIG. 7A, people detected by the person detection inference model are illustrated as being framed by rectangles. In the example in FIG. 7A, the object A, the object B, and the object C are detected from the shot image IMG of the overhead camera 300. The first recognition unit 121 writes information of the positions (coordinates) of people detected from the shot image of the overhead camera 300 to the RAM 102.

Note that the first recognition unit 121 is not limited to using a method by machine learning, and may use, for example, scale-invariant feature transform (SIFT), which is a method in which local feature points in an image are matched to detect people that are objects. Also, the first recognition unit 121 may detect people by using template matching, which is a method in which similarity to template images is found to detect objects.

Figure 7A:
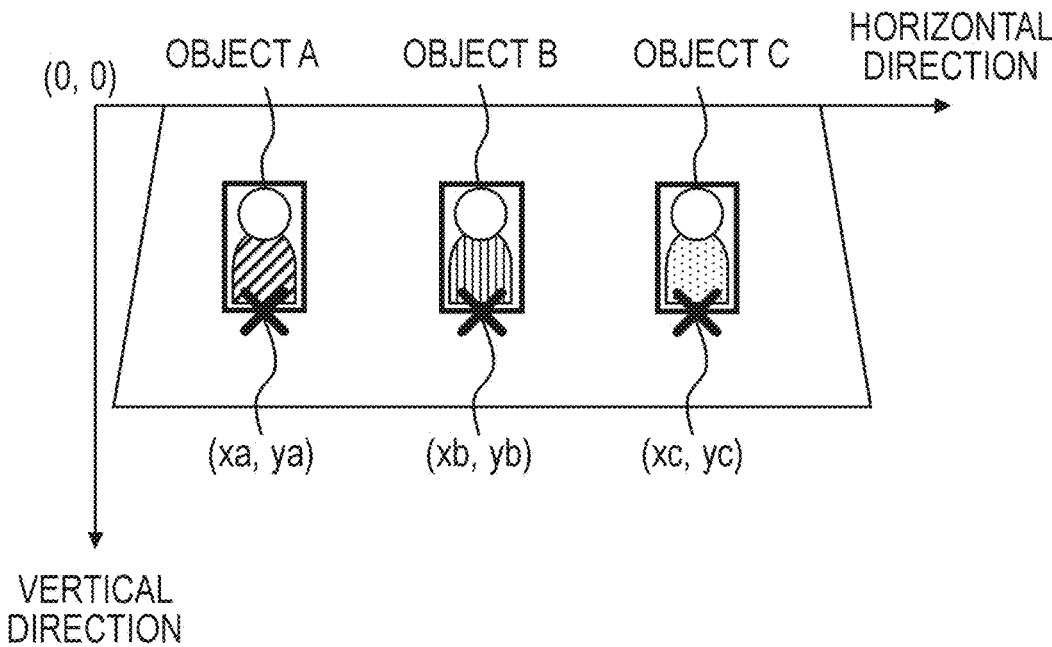
FIGS. 7A and 7B are diagrams for describing a method for detecting positions of objects.
Figure 7B:
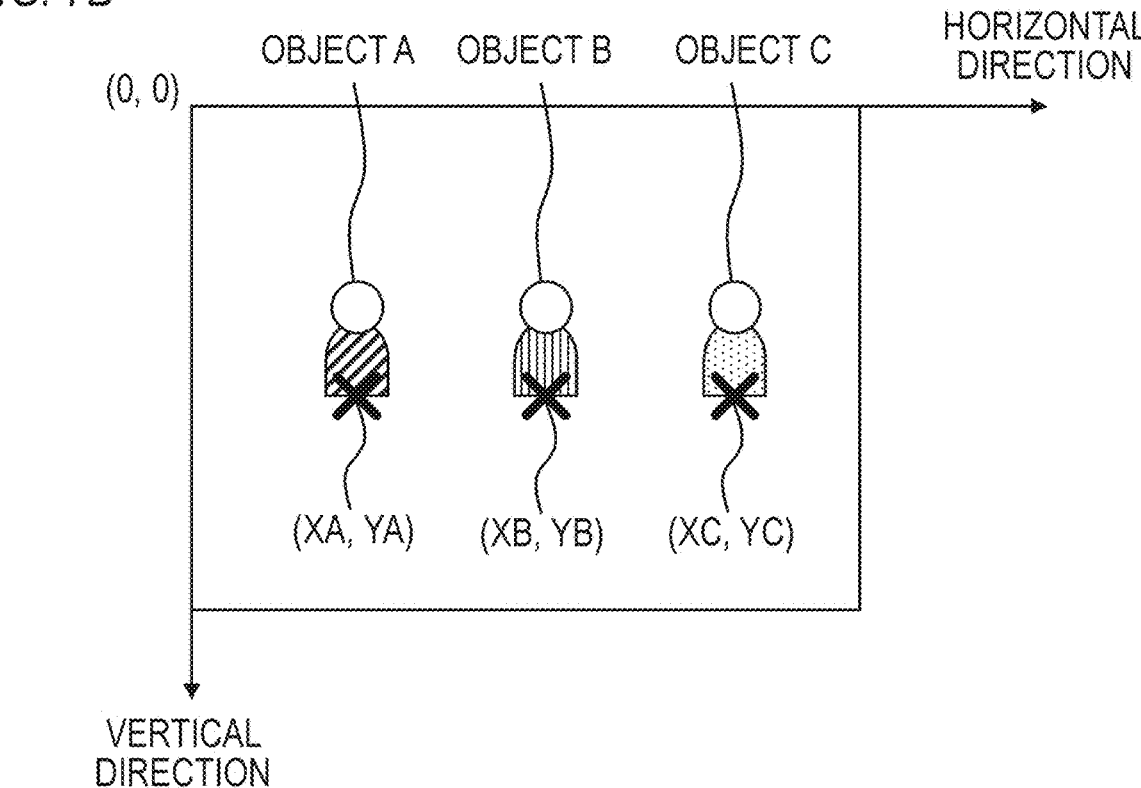

The first recognition unit 121 takes points on the rectangles framing the objects detected in the overhead camera coordinate system illustrated in FIG. 7A, midpoints on lower sides of the rectangles (the sides toward the feet) for example, as object detection positions. The first recognition unit 121 transforms the coordinates of the object detection positions into coordinates of the planar coordinate system illustrated in FIG. 7B, using Expression 1.

Specifically, the first recognition unit 121 reads the homography transform matrix H from the RAM 102, and substitutes coordinates (xa, ya) of the detection position of the object A in the overhead camera coordinate system into the x, y in Expression 1, and thus can perform transformation thereof into coordinates (XA, YA) in the planar coordinate system. In the same way, the first recognition unit 121 substitutes coordinates (xb, yb) and (xc, yc) of the detection positions of the object B and the object C into the x, y in Expression 1, and thus can perform transformation thereof into coordinates (XB, YB) and (XC, YC) of the object B and the object C in the planar coordinate system. The first recognition unit 121 writes the coordinates of the objects A, B, and C, after transformation, to the RAM 102 as the position information POSITION of the detected objects.

The first recognition unit 121 outputs, besides the position information POSITION of the detected objects, the identification information ID of the objects. The first recognition unit 121 can acquire the identification information ID of the detected objects using a trained model for identifying people that is stored in the ROM 103. This trained model is a trained model generated to output identification information ID of objects, by being caused to learn past shot images and detection results from the past shot images using a machine learning technique such as deep learning or the like.

The first recognition unit 121 can acquire identification information ID by inputting shot images of the overhead camera 300 and position information of objects detected in the shot images of the overhead camera 300, to the trained model for identifying people that is read out from the ROM 103. The trained model for identifying people can be generated by known technology. For example, the trained model for identifying people can be generated by taking past frame information and detection results in the past frame information as input, and performing learning so as to output the identification information ID. The first recognition unit 121 can acquire the identification information ID of the objects detected in the current frame, by inputting current frame information to the trained model for identifying people.

The main object deciding unit 122 decides a main object, which is the shooting object of the main camera 500, on the basis of the orientation of the main camera 500 and the position information of the objects. The main object deciding unit 122 acquires information of the main object that has been decided, as information indicating the shooting object. The main object deciding unit 122 decides the main object that is the shooting object of the main camera 500 on the basis of the position information POSITION of the object acquired by the first recognition unit 121, and orientation information ANGLE input from the main camera 500. For example, the main object deciding unit 122 can decide a object that is present at a position that is closest to the orientation (optical axis) of the main camera 500, out of the objects detected by the first recognition unit 121, to be the main object. The main object deciding unit 122 writes identification information MAIN_OBJECT_ID of the main object that is decided to the RAM 102.

Note that the main object deciding unit 122 may detect the main object from the shot image of the main camera 500. The main object deciding unit 122 can decide a object that is present at a position that is closest to the center of the shot image of the main camera 500, for example, to be the main object.

The tracking object deciding unit 123 decides a tracking object that is the shooting object of the sub-cameras 400, on the basis of the main object, and the correlative relation (role information ROLE) between the shooting object of the main camera 500 and the shooting object of the sub-cameras 400. The tracking object deciding unit 123 transmits information of the tracking object that is decided to the shooting direction acquisition unit 124.

The tracking object deciding unit 123 can decide the tracking object of the sub-camera 400*a* and the sub-camera 400*b*, for example, as follows. The tracking object deciding unit 123 acquires object information DETECT_INFO that is information of the object detected by the second recognition unit 125 from the shot images of the sub-camera 400*a* and the sub-camera 400*b*. The tracking object deciding unit 123 decides the tracking object on the basis of the identification information MAIN_OBJECT_ID of the main object, the object information DETECT_INFO, and the role information ROLE. The tracking object deciding unit 123 transmits identification information OBJECT_ID of the tracking object that has been decided, to the shooting direction acquisition unit 124.

Upon the shooting object of the main camera 500 being changed, the tracking object deciding unit 123 receives the identification information MAIN_OBJECT_ID of the main object for the shooting object after changing from the main object deciding unit 122. The tracking object deciding unit 123 acquires the identification information OBJECT_ID of the tracking object corresponding to the main object after changing, and performs transmission thereof to the shooting direction acquisition unit 124.

The tracking object deciding unit 123 determines, from the shot image IMG of the overhead camera 300, which of the sub-camera 400*a* and the sub-camera 400*b* that the tracking object is closer to. The tracking object deciding unit 123 transmits the identification information OBJECT_ID of the tracking object to the shooting direction acquisition unit 124, and instructs changing of the shooting direction of the sub-camera 400 that is closer to the tracking object (the sub-camera 400a here).

After the shooting direction of the sub-camera 400a that is closer to the tracking object has been changed, the tracking object deciding unit 123 receives the object information DETECT_INFO of the object detected from a shot image SUB_IMG of the sub-camera 400a. The tracking object deciding unit 123 confirms that the tracking object of the identification information OBJECT_ID is included in the shot image SUB_IMG of the sub-camera 400a. After confirmation, the tracking object deciding unit 123 transmits the identification information OBJECT_ID of the tracking object to the shooting direction acquisition unit 124, and instructs the sub-camera 400b, of which the shooting direction has not been changed, to change the shooting direction thereof.

A specific example in which the shooting object of the main camera 500 is changed, and the shooting object of the sub-cameras 400 is changed, will be described with reference to FIGS. 8A to 8D. The shooting directions of the sub-camera 400a and the sub-camera 400b are changed in order from FIG. 8A to FIG. 8D.

In the example in FIGS. 8A to 8D, the sub-camera 400a and the sub-camera 400b are shooting the object D in a case in which the main camera 500 is shooting the object B as the main object. In a case in which the shooting object of the main camera 500 is changed from the object B to the object A, the shooting object of the sub-camera 400a and the sub-camera 400b is changed to the object C. Note however, that the shooting object of the sub-camera 400a and of the sub-camera 400b is changed to the object C at different timings.

FIG. 8A illustrates a state in which the main camera 500 is shooting the object B, and the sub-camera 400a and the sub-camera 400b are shooting the object D corresponding to the object B. In FIG. 8B, the shooting object of the main camera 500 is changed from the object B to the object A, and the shooting direction of the main camera 500 is changed from a direction toward the object B to a direction toward the object A. The shooting object of the sub-cameras 400 corresponding to the object A is the object C.

In FIG. 8C, the shooting direction of the sub-camera 400a that is closer to the object C out of the sub-cameras 400 is changed from the direction toward the object D to the direction toward the object C that corresponds to the object A. At this point in time, the shooting direction of the sub-camera 400b remains in the direction toward the object D that corresponds to the object B, and is unchanged.

In FIG. 8D, the shooting direction of the sub-camera 400b is changed from the direction toward the object D to the direction toward the object C. Thus, after the shooting direction of the sub-camera 400a being changed to the direction toward the object C first, the shooting direction of the sub-camera 400b is changed from the direction toward the object D to the direction toward the object C. Accordingly, while the shooting direction of the sub-camera 400a is being changed from the direction toward the object D to the direction toward the object C, the sub-camera 400b can record shot images of the object D. Also, while the shooting direction of the sub-camera 400b is being changed from the direction toward the object D to the direction toward the object C, the sub-camera 400a can record shot images of the object C.

Note that while FIG. 8C illustrates an example in which the shooting direction of the sub-camera 400a that is closer to the object C is changed first, which of the sub-cameras 400 to change the shooting direction first is not limited to cases of deciding on the basis of distance to the tracking object. The tracking object deciding unit 123 may decide which of the sub-cameras 400 to change the shooting direction first on the basis of user operations, for example.

Also, the tracking object deciding unit 123 may decide which of the sub-cameras 400 to change the shooting direction first on the basis of the positions of the sub-cameras 400, regions of movement of the shooting directions (optical axis directions) of the sub-cameras 400, and the position of the tracking object. For example, the tracking object deciding unit 123 can change the shooting direction first for the sub-camera 400 of which the tracking object after changing is included in the region of movement of the shooting direction. Also, the tracking object deciding unit 123 may change the shooting direction later for the sub-camera 400 that is capable of shooting the tracking object before changing at the center of the image (if both the sub-camera 400a and the sub-camera 400b are capable of shooting at the center of the image, one or the other).

Although an example is illustrated in FIGS. 8A to 8D in which the number of sub-cameras 400 is two, the number of sub-cameras 400 may be three or more. In a case in which there are three or more sub-cameras 400, upon the shooting direction of the main camera 500 being changed, the tracking object deciding unit 123 divides the plurality of sub-cameras 400 into a plurality of groups having different timings for changing the shooting direction.

For example, in a case in which additional sub-cameras 400 that are omitted from illustration are present in FIG. 8B, the tracking object deciding unit 123 divides the plurality of sub-cameras 400 into a first group including the sub-camera 400b, and a second group including the sub-camera 400a. In a case in which the shooting direction of the main camera 500 is changed from the object B to the object A, the tracking object deciding unit 123 does not change the shooting direction of the sub-cameras 400 included in the first group, out of the plurality of sub-cameras 400, from the direction toward the object D corresponding to the object B. Conversely, in a case in which the shooting direction of the main camera 500 is changed, the tracking object deciding unit 123 changes the shooting direction of the sub-cameras 400 included in the second group, out of the plurality of sub-cameras 400, from the direction toward the object D to the direction toward the object C corresponding to the object A.

The tracking object deciding unit 123 can divide the plurality of sub-cameras 400 into the first group and the second group by various methods. The tracking object deciding unit 123 can, for example, divide the plurality of sub-cameras 400 into the first group and the second group on the basis of the positions of each of the plurality of sub-cameras 400.

More specifically, the tracking object deciding unit 123 groups the plurality of sub-cameras 400 on the basis of the positions of each of the plurality of sub-cameras 400, and distance to the tracking object corresponding to the object before the shooting direction of the main camera 500 is changed. In the example in FIG. 8B, the tracking object deciding unit 123 changes the shooting direction of the sub-cameras 400 of the first group that is closer to the object D, for example, at a later time.

Also, the tracking object deciding unit 123 may group the plurality of sub-cameras 400 on the basis of the positions of each of the plurality of sub-cameras 400, and distance to the tracking object corresponding to the object after the shooting direction of the main camera 500 is changed. In the example in FIG. 8B, the tracking object deciding unit 123 changes the shooting direction of the sub-cameras 400 of the second group, which is closer to the object C for example, first. Note that the tracking object deciding unit 123 may group the plurality of sub-cameras 400 on the basis of both distance to the object D and distance to the object C.

The tracking object deciding unit 123 may group the plurality of sub-cameras 400 on the basis of relative position as to the tracking object, and is not limited to grouping on the basis of distance to the tracking object. The relative position as to the tracking object is expressed by the distance from the sub-camera 400 to the tracking object and the direction of the tracking object as to the optical axis of the sub-camera 400. The tracking object deciding unit 123 can group the plurality of sub-cameras 400 on the basis of the relative position as to the tracking object before and after changing the shooting direction of the main camera 500. The tracking object deciding unit 123 may group the plurality of sub-cameras 400 on the basis of relative positions as to each of the tracking object before changing the shooting direction of the main camera 500 and the tracking object after changing thereof.

The tracking object deciding unit 123 may group the plurality of sub-cameras 400 into the first group and the second group such that adjacent sub-cameras 400 do not belong to the same group. Keeping adjacent ones of the sub-cameras 400 from belonging to the same group enables the control device 100 to shoot the tracking object from various angles, both before and after changing the shooting direction.

The tracking object deciding unit 123 may group the plurality of sub-cameras 400 on the basis of the region of movement of the shooting direction of the sub-cameras 400, and is not limited to grouping on the basis of the distance as to the tracking object or the relative position as to the tracking object. The region of movement of the shooting direction indicates a range over which the orientation of the optical axis of the sub-camera 400 can be changed.

Grouping based on the region of movement of shooting direction of the sub-cameras 400 will be described with reference to FIGS. 9A to 9C. The tracking object deciding unit 123 groups the plurality of sub-cameras 400 on the basis of the positions of the sub-cameras 400, regions of movement of the shooting directions of the sub-cameras 400, and position of the tracking object. A tracking object 903 illustrated in FIGS. 9A to 9C is a tracking object that corresponds to the object after changing the shooting object of the main camera 500.

Figure 9B:
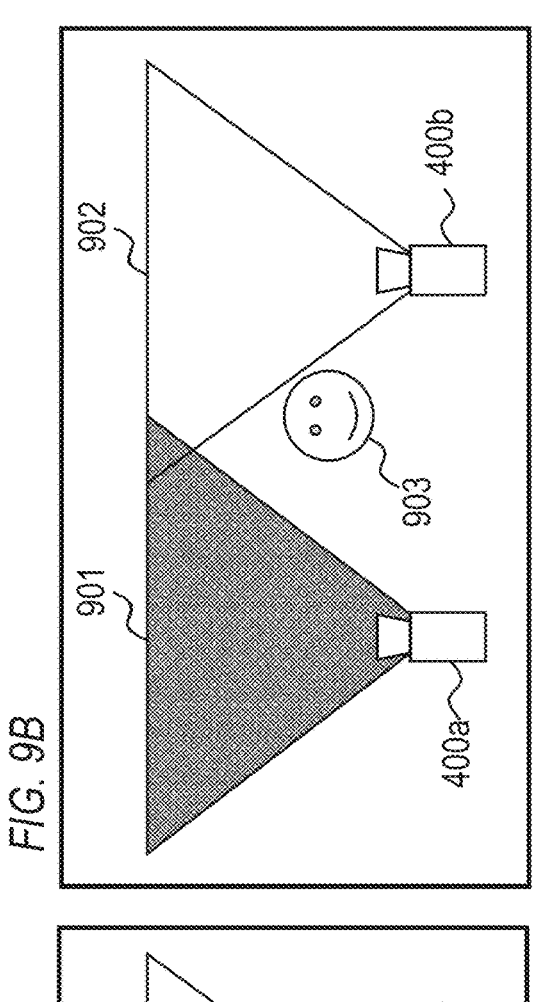
FIGS. 9A to 9C are diagrams for performing description regarding grouping of the sub-cameras.
Figure 9A:
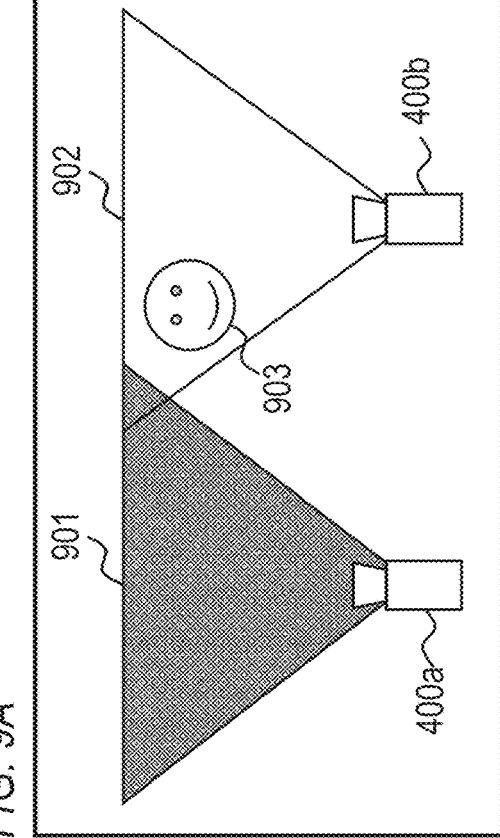

FIG. 9A illustrates the sub-camera 400a, a region of movement 901 of the shooting direction of the sub-camera 400a, the sub-camera 400b, a region of movement 902 of the shooting direction of the sub-camera 400b, and the tracking object 903. The tracking object 903 is present in the region of movement 902 of the shooting direction of the sub-camera 400b. The tracking object deciding unit 123 sets the sub-cameras 400 regarding which the tracking object 903 is present in the region of movement of the shooting direction as the second group, and changes the shooting direction of the sub-cameras 400 of the second group first.

FIG. 9B illustrates the sub-camera 400a, the region of movement 901 of the shooting direction of the sub-camera 400a, the sub-camera 400b, the region of movement 902 of the shooting direction of the sub-camera 400b, and the tracking object 903, in the same way as in FIG. 9A. However, the tracking object 903 is included in neither the region of movement 901 of the shooting direction of the sub-camera 400a nor the region of movement 902 of the shooting direction of the sub-camera 400b, For example, the tracking object deciding unit 123 can set the sub-cameras 400 regarding which the distance from the position of the tracking object 903 to the region of movement is shorter than a predetermined threshold value as being the second group, and change the shooting direction of the sub-cameras 400 of the second group first.

Figure 9C:
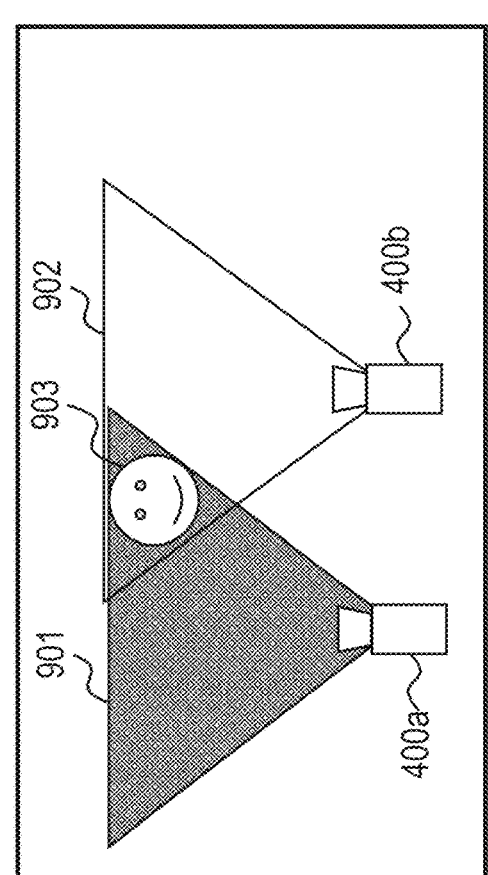

FIG. 9C illustrates the sub-camera 400a, the region of movement 901 of the shooting direction of the sub-camera 400a, the sub-camera 400b, the region of movement 902 of the shooting direction of the sub-camera 400b, and the tracking object 903, in the same way as in FIG. 9A. However, the tracking object 903 is included in both the region of movement 901 of the shooting direction of the sub-camera 400a and the region of movement 902 of the shooting direction of the sub-camera 400b, In this case, the tracking object deciding unit 123 may group the plurality of sub-cameras 400 on the basis of conditions other than region of movement.

In FIGS. 9A to 9C, the tracking object 903 is assumed to be the tracking object corresponding to the object after changing the shooting object of the main camera 500, but may be the tracking object corresponding to the object before changing the shooting object of the main camera 500. That is to say, the tracking object deciding unit 123 may group the plurality of sub-cameras 400 on the basis of the positions of the sub-cameras 400, the regions of movement of the shooting directions of the sub-cameras 400, and the position of the tracking object before changing. For example, the tracking object deciding unit 123 sets, as the first group, the sub-cameras 400 (or a part thereof) capable of controlling panning and tilting directions such that the tracking object before changing is situated in the optical axis direction, and changes the shooting directions of the sub-cameras 400 in the first group later.

The tracking object deciding unit 123 may also divide the plurality of sub-cameras 400 into the first group and the second group on the basis of user operations. The tracking object deciding unit 123 may acquire grouping information stored in the ROM 103 in advance on the basis of user operations, or may acquire grouping information by accepting operations from the user while shooting.

For a method of grouping the plurality of sub-cameras 400, various methods described above can be combined and applied as appropriate. Also, the plurality of sub-cameras 400 is not limited to being divided into two groups, and may be divided into three or more groups, in accordance with the number of objects being tracked.

The shooting direction acquisition unit 124 receives, from the tracking object deciding unit 123, information of the sub-camera 400 regarding which the shooting direction is to be changed, and the identification information OBJECT_ID of the tracking object, and calculates control values for panning and tilting of the sub-camera 400.

The shooting direction acquisition unit 124 reads the coordinates of the sub-camera 400 in the planar coordinate system, included in the reference position information REF_POSI, and the coordinates of the tracking object, included in the position information POSITION of the detected object, from the RAM 102. The shooting direction acquisition unit 124 calculates control values for panning and tilting, for the sub-camera 400 to face toward the direction of the tracking object, on the basis of the coordinates of the sub-camera 400 and the coordinates of the tracking object. A method of calculating target positions of panning and tilting as control values for panning and tilting will be described with reference to FIGS. 10 and 11.

Figures 10, 11:
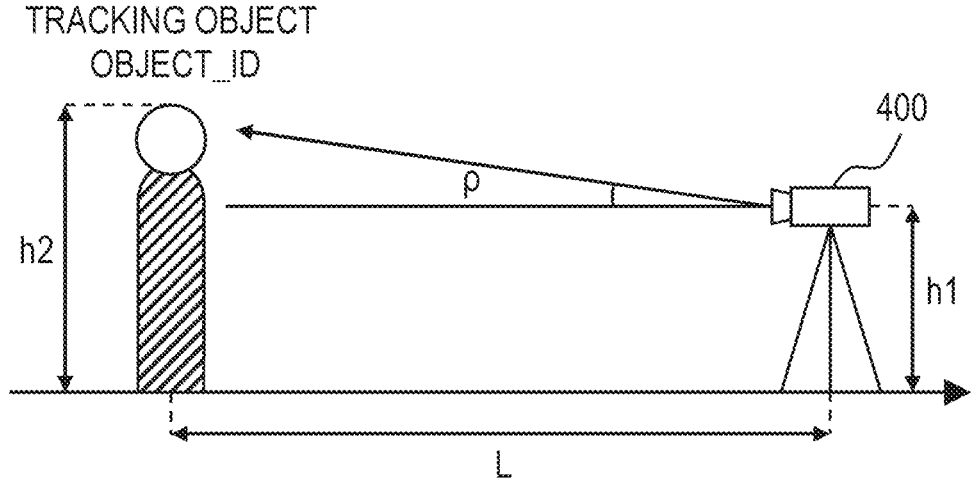
FIG. 10 is a diagram for describing a target position for panning.
FIG. 11 is a diagram for describing a target position for tilting.

FIG. 10 is a diagram for describing a target position for panning. An angle θ representing the target position for panning is an angle formed between a line extending from the center of the optical axis of the sub-camera 400 and a line connecting the sub-camera 400 and the tracking object. The angle θ can be calculated by the following Expression 2.

[Math 2]

$$\theta = \tan^{-1}\frac{px - subx}{py - suby}(\text{rad}) \qquad \text{(Expression 2)}$$

In Expression 2, px, py are horizontal coordinates and vertical coordinates of the position of the tracking object, and subx, suby are horizontal coordinates and vertical coordinates of the sub-camera 400. The shooting direction acquisition unit 124 can acquire the coordinates px, py corresponding to the position of the tracking object from the position information POSITION of the detected object.

FIG. 11 is a diagram for describing a target position for tilting. An angle ρ representing the target position for tilting is an angle formed between a line extending from the optical axis of the sub-camera 400 at a height h1 of the optical axis of the sub-camera 400 and a line extending from the sub-camera 400 toward the vertex of the tracking object at a height h2. The angle ρ can be calculated by the following Expression 3 and Expression 4.

[Math 3]

$$L = \sqrt{(px - subx)^2 + (py - suby)^2} \qquad \text{(Expression 3)}$$

$$\rho = \tan^{-1}\frac{h2 - h1}{L}(\text{rad}) \qquad \text{(Expression 4)}$$

In Expression 4, L is the distance from the sub-camera 400 to the tracking object. Also, h1 is the height of the optical axis of the sub-camera 400 from the ground, and h2 is the height of the tracking object from the ground to the vertex. The heights h1 and h2 may be saved in the RAM 102 in advance, or may be measured in real time using a sensor that is omitted from illustration.

The control values for panning and tilting may be angular velocity values for the sub-camera 400 to turn to the direction of the tracking object. An example of a calculation method of angular velocity values for panning and tilting will be described. The shooting direction acquisition unit 124 acquires current panning and tilting positions of the sub-camera 400 via the network I/F 105. The shooting direction acquisition unit 124 finds an angular velocity for panning that is proportionate to the difference between the current panning position and target panning position. Also, the shooting direction acquisition unit 124 finds an angular velocity for tilting that is proportionate to the difference between the current tilting position and target tilting position. The shooting direction acquisition unit 124 writes the control values for panning and tilting that are calculated to the RAM 102.

The second recognition unit 125 determines whether or not a tracking object has been detected from the shot image SUB_IMG of the sub-camera 400, using the inference model for person identification that is stored in the ROM 103, in the same way as the first recognition unit 121. The second recognition unit 125 transmits the determination results to the tracking object deciding unit 123 as object information DETECT_INFO.

Figure 12A:
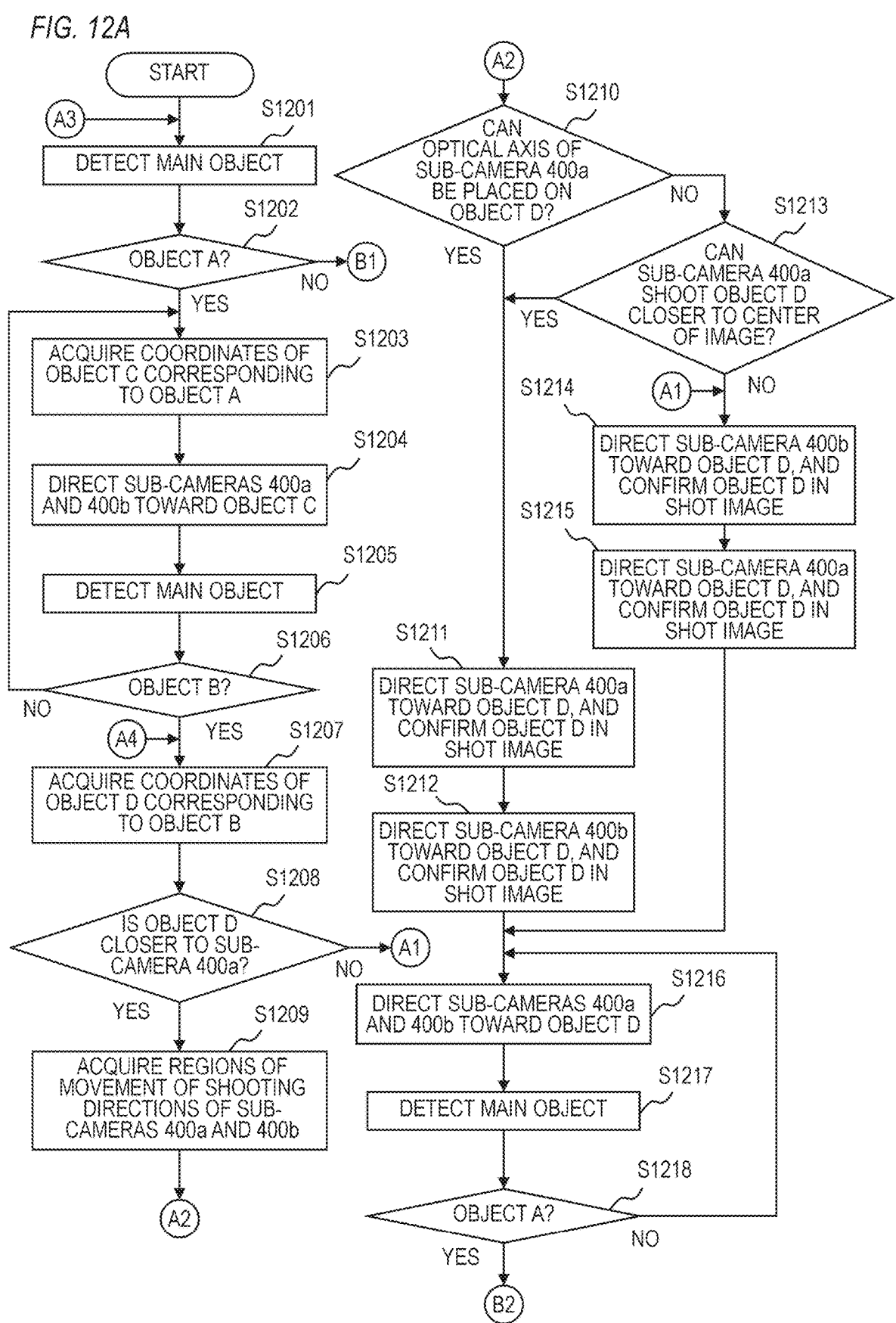
FIG. 12A is a flowchart exemplifying control processing of shooting directions of sub-cameras.
Figure 12B:
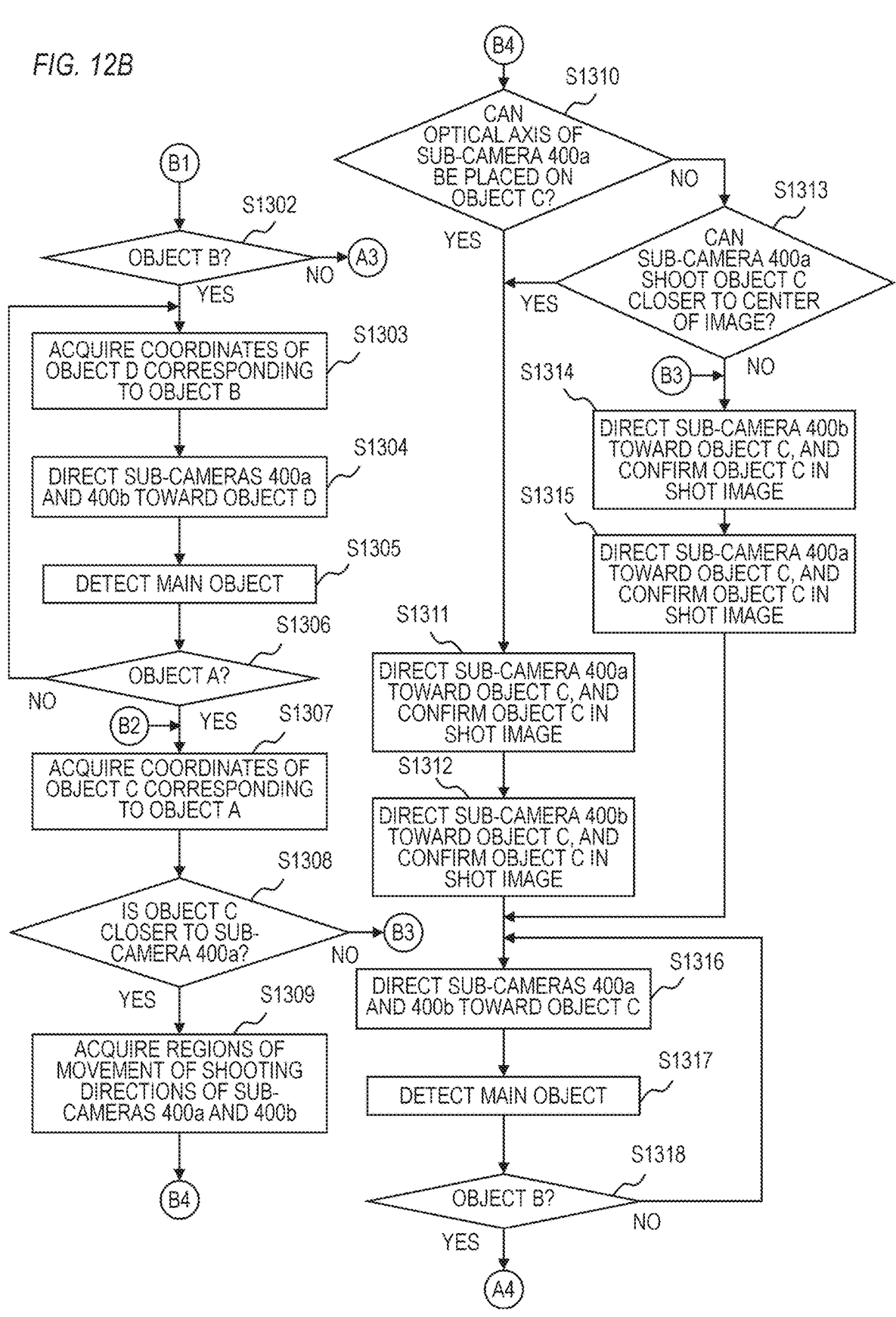
FIG. 12B is a flowchart exemplifying control processing of shooting directions of sub-cameras.

Processing for controlling the shooting directions of the plurality of sub-cameras 400 so as to face a shooting object corresponding to the shooting object of the main camera 500 will be described with reference to FIGS. 12A and 12B. FIGS. 12A and 12B are flowcharts exemplifying control processing of the shooting directions of the sub-cameras 400. FIGS. 12A and 12B show an example of processing in which the sub-cameras 400a and 400b shoot the object C when the main camera 500 is shooting the object A, and the sub-cameras 400a and 400b shoot the object D when the main camera 500 is shooting the object B. The sub-cameras 400a and 400b may also be collectively referred to as "sub-cameras 400".

In step S1201 in FIG. 12A, the CPU 101 detects a main object that is a shooting object of the main camera 500. The CPU 101 acquires information of the main object that is detected as information indicating the shooting object of the main camera 500. Specifically, the first recognition unit 121 acquires a shot image of the main camera 500 and detects the object. The first recognition unit 121 transmits position information of the object that is detected (including information of coordinates) and identification information to the main object deciding unit 122. The main object deciding unit 122 decides the main object on the basis of the orientation of the main camera 500, or a position that the object is in the shot image of the main camera 500 and so forth. The main object decided by the main object deciding unit 122 is taken as the main object detected in step S1201.

In step S1202, the CPU 101 determines whether or not the main object detected in step S1201 is the object A. In a case in which the main object that is detected is the object A, the processing advances to step S1203. In a case in which the main object that is detected is not the object A, the processing advances to step S1302 in FIG. 12B.

In step S1203, the CPU 101 acquires the coordinates of the object C that is the shooting object of the sub-cameras 400 corresponding to the object A that is the main object. Specifically, the main object deciding unit 122 transmits identification information and position information of the main object to the tracking object deciding unit 123. Also, the role setting unit 120 transmits information regarding the correlative relation between the shooting object of the main camera 500 and the shooting object of the sub-cameras 400 to the tracking object deciding unit 123. The tracking object deciding unit 123 decides the tracking object to be the object C. The tracking object deciding unit 123 acquires position information (including information of coordinates) of the object C from the shot image of the overhead camera 300. The tracking object deciding unit 123 transmits the position information of the object C that is acquired to the shooting direction acquisition unit 124.

In step S1204, the CPU 101 directs the sub-cameras 400a and 400b toward the object C. Specifically, the shooting direction acquisition unit 124 acquires the control values for panning and tilting of each of the sub-cameras 400a and 400b, to perform control such that the shooting directions thereof each face the object C that is the tracking object. The shooting direction acquisition unit 124 transmits the control values for panning and tilting of each to the sub-cameras 400a and 400b. The sub-cameras 400a and 400b direct their shooting directions toward the object C on the basis of the control values for panning and tilting that are received from the shooting direction acquisition unit 124.

In step S1205, the CPU 101 detects the main object that is the shooting object of the main camera 500, in the same way as in step S1201. In step S1206, the CPU 101 determines whether or not the main object detected in step S1205 is the object B.

In a case in which the main object that is detected is the object B, determination is made that the shooting direction of the main camera 500 has been changed from a direction facing the object A to a direction facing the object B, and the processing advances to step S1207. Thus, whether or not the shooting direction of the main camera 500 has been changed can be determined on the basis of change in the object detected from the shot image of the main camera 500. In a case in which the main object detected in step S1205 is not the object B, the processing returns to step S1203.

In step S1207, the CPU 101 acquires the coordinates of the object D that is the shooting object of the sub-cameras 400 corresponding to the object B that is the main object. The CPU 101 can acquire the coordinates of the object D from the shot image of the overhead camera 300, in the same way as in step S1203.

In step S1208, the CPU 101 determines which of the sub-camera 400a and the sub-camera 400b that the object D is closer to (which is the shorter distance). In a case in which the object D is closer to the sub-camera 400a than to the sub-camera 400b, the processing advances to step S1209. In a case in which the object D is closer to the sub-camera 400b than to the sub-camera 400a, the processing advances to step S1214.

In step S1209, the CPU 101 acquires information of the region of movement of the shooting direction of each of the sub-cameras 400a and 400b. The regions of movement of the shooting directions of the sub-cameras 400 indicate ranges over which the optical axes of the sub-cameras 400 can be directed.

In step S1210, the CPU 101 determines whether or not a line (optical axis) extending in a frontal direction from the center of the lens can be placed upon the object D by panning the sub-camera 400a. That is to say, the CPU 101 determines whether or not the object D can be shot so as to be at a position at the substantial center of the shot image of the sub-camera 400a. In a case in which the optical axis of the sub-camera 400a can be placed upon the object D, the processing advances to step S1211. In a case in which the optical axis of the sub-camera 400a is not placed upon the object D, the processing advances to step S1213.

In step S1211, the CPU 101 directs the sub-camera 400a toward the object D. Specifically, the shooting direction acquisition unit 124 acquires control values for panning and tilting to perform control such that the shooting direction of the sub-camera 400a faces toward the object D that is the tracking object. The shooting direction acquisition unit 124 transmits the control values for panning and tilting that are acquired to the sub-camera 400a. The sub-camera 400a directs the shooting direction thereof toward the object D on the basis of the control values for panning and tilting that are received from the shooting direction acquisition unit 124. The second recognition unit 125 acquires the shot image of the sub-camera 400a, and confirms that the object D is detected from the shot image that is acquired. As a result of the processing of step S1211, the CPU 101 can confirm that the shooting direction of the sub-camera 400a has been changed to a direction facing the object D, and that the object D is being successfully tracked.

In step S1212, the CPU 101 directs the sub-camera 400b toward the object D. Specifically, the shooting direction acquisition unit 124 acquires the control values for panning and tilting to perform control such that the shooting direction of the sub-camera 400b faces toward the object D that is the tracking object. The shooting direction acquisition unit 124 transmits the control values for panning and tilting that are acquired to the sub-camera 400b. The sub-camera 400b directs the shooting direction thereof toward the object D on the basis of the control values for panning and tilting that are received from the shooting direction acquisition unit 124. The second recognition unit 125 acquires the shot image of the sub-camera 400b, and confirms that the object D is detected from the shot image that is acquired. As a result of the processing of step S1212, the CPU 101 can confirm that the shooting direction of the sub-camera 400b has been changed to a direction facing the object D, and that the object D is being successfully tracked.

In step S1213, the CPU 101 determines which of the sub-camera 400a and the sub-camera 400b can shoot the object D at a position closer to the center of the screen. The CPU 101 can, for example, determine that when the optical axes of the sub-camera 400a and the sub-camera 400b are made to approach the object D within the ranges of regions of movement thereof, the sub-camera 400 of which the optical axis is closer to the object D can shoot the object D at a position closer to the center of the screen. In a case in which the sub-camera 400a can shoot the object D at a position closer to the center of the screen, the processing advances to step S1211. In a case in which the sub-camera 400b can shoot the object D at a position closer to the center of the screen, the processing advances to step S1214.

In step S1214, the CPU 101 directs the sub-camera 400b toward the object D, in the same way as in step S1212. In step S1215, the CPU 101 directs the sub-camera 400a toward the object D, in the same way as in step S1211.

In step S1216, the CPU 101 directs the sub-cameras 400a and 400b toward the object D. Specifically, the shooting direction acquisition unit 124 acquires control values for panning and tilting for each of the sub-cameras 400a and 400b, to control the shooting directions thereof to face the object D that is the tracking object. The shooting direction acquisition unit 124 transmits the control values for panning and tilting to the sub-cameras 400a and 400b, respectively. The sub-cameras 400a and 400b direct the shooting directions thereof toward the object D, on the basis of the control values for panning and tilting received from the shooting direction acquisition unit 124.

In step S1217, the CPU 101 detects the main object that is the shooting object of the main camera 500, in the same way as in step S1201. In step S1218, the CPU 101 determines whether or not the main object detected in step S1217 is the object A. In a case in which the main object detected in step S1217 is the object A, determination is made that the shooting direction of the main camera 500 has been changed from a direction facing the object B to a direction facing the object A, and the processing advances to step S1307 in FIG. 12B. In a case in which the main object that is detected is not the object A, the processing returns to step S1216.

In step S1302, the CPU 101 determines whether or not the main object detected in step S1201 in FIG. 12A is the object B. In a case in which the main object that is detected is the object B, the processing advances to step S1303. In a case in which the main object that is detected is not the object B, the processing advances to step S1201 in FIG. 12A.

In step S1303, the CPU 101 acquires the coordinates of the object D that is the shooting object of the sub-cameras 400 corresponding to the object B that is the main object. Specifically, the main object deciding unit 122 transmits the identification information and the position information of the main object to the tracking object deciding unit 123. Also, the role setting unit 120 transmits information regarding the correlative relation between the shooting object of the main camera 500 and the shooting object of the sub-cameras 400 to the tracking object deciding unit 123. The tracking object deciding unit 123 decides the tracking object to be the object D. The tracking object deciding unit 123 acquires the position information (including information of coordinates) of the object D from the shot image of the overhead camera 300. The tracking object deciding unit 123 transmits the position information of the object D that is acquired to the shooting direction acquisition unit 124.

In step S1304, the CPU 101 directs the sub-cameras 400a and 400b toward the object D. Specifically, the shooting direction acquisition unit 124 acquires control values for panning and tilting for each of the sub-cameras 400a and 400b, to control the shooting directions thereof to face the object D that is the tracking object. The shooting direction acquisition unit 124 transmits the control values for panning and tilting to the sub-cameras 400a and 400b, respectively. The sub-cameras 400a and 400b direct the shooting directions thereof toward the object D, on the basis of the control values for panning and tilting received from the shooting direction acquisition unit 124.

In step S1305, the CPU 101 detects the main object that is the shooting object of the main camera 500 in the same way as in step S1201. In step S1306, the CPU 101 determines whether or not the main object detected in step S1305 is the object A.

In a case in which the main object that is detected is the object A, determination is made that the shooting direction of the main camera 500 has been changed from a direction facing the object B to a direction facing the object A, and the processing advances to step S1307. In a case in which the main object that is detected in step S1305 is not the object A, the processing returns to step S1303.

In step S1307, the CPU 101 acquires the coordinates of the object C that is the shooting object of the sub-cameras 400 corresponding to the object A that is the main object. The CPU 101 can acquire the coordinates of the object C from the shot image of the overhead camera 300 in the same way as in step S1203.

In step S1308, the CPU 101 determines which of the sub-camera 400a and the sub-camera 400b that the object C is closer to (which is the shorter distance). In a case in which the object C is closer to the sub-camera 400a than to the sub-camera 400b, the processing advances to step S1309. In a case in which the object C is closer to the sub-camera 400b than to the sub-camera 400a, the processing advances to step S1314.

In step S1309, the CPU 101 acquires information of the region of movement of the shooting direction of each of the sub-cameras 400a and 400b. The regions of movement of the shooting directions of the sub-cameras 400 indicate ranges over which the optical axes of the sub-cameras 400 can be directed.

In step S1310, the CPU 101 determines whether or not a line (optical axis) extending in a frontal direction from the center of the lens can be placed upon the object C by panning the sub-camera 400a. That is to say, the CPU 101 determines whether or not the object C can be shot so as to be at a position at the substantial center of the shot image of the sub-camera 400a. In a case in which the optical axis of the sub-camera 400a can be placed upon the object C, the processing advances to step S1311. In a case in which the optical axis of the sub-camera 400a is not placed upon the object C, the processing advances to step S1313.

In step S1311, the CPU 101 directs the sub-camera 400a toward the object C. Specifically, the shooting direction acquisition unit 124 acquires control values for panning and tilting to perform control such that the shooting direction of the sub-camera 400a faces toward the object C that is the tracking object. The shooting direction acquisition unit 124 transmits the control values for panning and tilting that are acquired to the sub-camera 400a. The sub-camera 400a directs the shooting direction thereof toward the object C on the basis of the control values for panning and tilting that are received from the shooting direction acquisition unit 124. The second recognition unit 125 acquires the shot image of the sub-camera 400a, and confirms that the object C is detected from the shot image that is acquired. As a result of the processing of step S1311, the CPU 101 can confirm that the shooting direction of the sub-camera 400a has been changed to a direction facing the object C, and that the object C is being successfully tracked.

In step S1312, the CPU 101 directs the sub-camera 400b toward the object C. Specifically, the shooting direction acquisition unit 124 acquires the control values for panning and tilting to perform control such that the shooting direction of the sub-camera 400b faces toward the object C that is the tracking object. The shooting direction acquisition unit 124 transmits the control values for panning and tilting that are acquired to the sub-camera 400b. The sub-camera 400b directs the shooting direction thereof toward the object C on the basis of the control values for panning and tilting that are received from the shooting direction acquisition unit 124. The second recognition unit 125 acquires the shot image of the sub-camera 400b, and confirms that the object C is detected from the shot image that is acquired. As a result of the processing of step S1312, the CPU 101 can confirm that the shooting direction of the sub-camera 400b has been changed to a direction facing the object C, and that the object C is being successfully tracked.

In step S1313, the CPU 101 determines which of the sub-camera 400a and the sub-camera 400b can shoot the object C at a position closer to the center of the screen. The CPU 101 can, for example, determine that when the optical axes of the sub-camera 400a and the sub-camera 400b are made to approach the object C within the ranges of regions of movement thereof, the sub-camera 400 of which the optical axis is closer to the object C can shoot the object C at a position closer to the center of the screen. In a case in which the sub-camera 400a can shoot the object C at a position closer to the center of the screen, the processing advances to step S1311. In a case in which the sub-camera 400b can shoot the object C at a position closer to the center of the screen, the processing advances to step S1314.

In step S1314, the CPU 101 directs the sub-camera 400b toward the object C, in the same way as in step S1312. In step S1315, the CPU 101 directs the sub-camera 400a toward the object C, in the same way as in step S1311.

In step S1316, the CPU 101 directs the sub-cameras 400a and 400b toward the object C. Specifically, the shooting direction acquisition unit 124 acquires control values for panning and tilting for each of the sub-cameras 400a and 400b, to control the shooting directions thereof to face the object C that is the tracking object. The shooting direction acquisition unit 124 transmits the control values for panning and tilting to the sub-cameras 400a and 400b, respectively. The sub-cameras 400a and 400b direct the shooting directions thereof toward the object C, on the basis of the control values for panning and tilting received from the shooting direction acquisition unit 124.

In step S1317, the CPU 101 detects the main object that is the shooting object of the main camera 500, in the same way as in step S1201 in FIG. 12A. In step S1318, the CPU 101 determines whether or not the main object detected in step S1317 is the object B. In a case in which the main object detected in step S1317 is the object B, determination is made that the shooting direction of the main camera 500 has been changed from a direction facing the object A to a direction facing the object B, and the processing advances to step S1207 in FIG. 12A. In a case in which the main object that is detected is not the object B, the processing returns to step S1316.

Note that while an example is illustrated in FIGS. 12A and 12B in which the number of sub-cameras 400 is two, the number of sub-cameras 400 may be three or more. In this case, the control device 100 can divide the plurality of sub-cameras 400 into a group that changes the shooting direction at the same timing as the sub-camera 400a, and a group that changes the shooting direction at the same timing as the sub-camera 400b. The control device 100 can group the plurality of sub-cameras 400 before the processing of steps S1211 and S1214 in FIG. 12A, and steps S1311 and S1314 in FIG. 12B.

The control device 100 can group the plurality of sub-cameras 400 on the basis of, for example, the relative positions between the sub-cameras 400 and the tracking object, the distances between the sub-cameras 400 and the tracking object, or the regions of movement of the shooting directions of the sub-cameras 400. Also, the control device 100 may group the plurality of sub-cameras 400 such that adjacent sub-cameras 400 do not belong to the same group. Also, the control device 100 may group the plurality of sub-cameras 400 on the basis of user operations. The control device 100 may group the plurality of sub-cameras 400 in accordance with any combination of these various conditions.

Also, in FIGS. 12A and 12B, processing that takes into consideration the regions of movement of the shooting directions of the sub-cameras 400 may be omitted. That is to say, the processing of steps S1209, S1210, and S1213 in FIG. 12A, and the processing of steps S1309, S1310, and S1313 in FIG. 12B, can be omitted.

Also, the control device 100 performs control such that, in a case in which the shooting direction of the main camera 500 is a direction facing the object A and the object A ceases to be detected from the shot image of the main camera 500, the shooting direction of the sub-camera 400 of which the shooting direction is to be changed first is not changed from the object C. Further, the control device 100 performs control such that, in a case in which the shooting direction of the main camera 500 is changed to a direction facing the object B but the object B is not detected from the shot image of the main camera 500, the shooting direction of the sub-camera 400 of which the shooting direction is to be changed first is not changed from the object C.

In the above embodiment, at a time of controlling shooting directions of a plurality of sub-cameras 400 so as to face a shooting object corresponding to a shooting object of the main camera 500, the control device 100 changes shooting directions of a part of the sub-cameras 400 first, and does not change shooting directions of other sub-cameras 400. After the shooting directions of the part of the sub-cameras 400 are changed, the control device 100 changes the shooting directions of the other sub-cameras 400. Thus, at the time of changing objects in multi-camera shooting, shooting of objects before and after changing can be performed by effective angles of view by a plurality of cameras. Accordingly, at the time of editing after shooting and during live broadcasting, the user can obtain desired images from images shot at a plurality of angles of view, even for scenes in which objects are changed.

It should be noted that the above embodiment is only an example, and that configuration obtained by modifying and altering configurations of the above embodiment as appropriate within the spirit and scope of the present invention are also encompassed by the present invention. Configurations obtained by combining configurations of the above embodiment as appropriate are also encompassed by the present invention.

According to the present invention, at a time of changing objects in shooting by a plurality of cameras, control can be performed such that desired images are obtained.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-158241, filed on Sep. 22, 2023, which is hereby incorporated by reference herein in its entirety.

What is claimed is:

1. A control device, comprising:
a processor; and
a memory storing a program which, when executed by the processor, causes the control device to:
execute acquisition processing of acquiring information indicating a shooting object of a first image-capturing device; and
execute control processing of controlling a shooting direction of a plurality of second image-capturing devices so as to face a shooting object corresponding to the shooting object of the first image-capturing device, wherein
in the control processing, in a case in which a shooting direction of the first image-capturing device is changed from a direction facing a first object to a direction facing a second object,
   a shooting direction of image-capturing devices included in a first group, out of the plurality of the second image-capturing devices, is not changed from a direction facing a third object corresponding to the first object, and
   a shooting direction of image-capturing devices included in a second group, out of the plurality of the second image-capturing devices, is changed from the direction facing the third object, to a direction facing a fourth object corresponding to the second object, and
   in the control processing, after the shooting direction of the image-capturing devices included in the second group is changed to the direction facing the fourth object, the shooting direction of the image-capturing devices included in the first group is changed from the direction facing the third object to the direction facing the fourth object.

2. The control device according to claim 1, wherein whether or not the shooting direction of the first image-capturing device has been changed from the direction facing the first object to the direction facing the second object is determined based on change in a object detected from a shot image of the first image-capturing device.

3. The control device according to claim 1, wherein in the control processing, in a case in which the shooting direction of the first image-capturing device is the direction facing the first object and the first object ceases to be detected from a shot image of the first image-capturing device, or in a case in which the shooting direction of the first image-capturing device is changed to the direction facing the second object but the second object is not detected from the shot image of the first image-capturing device, the shooting direction of the image-capturing devices included in the second group is not changed from the direction facing the third object.

4. The control device according to claim 1, wherein the first object and the third object are the same object.

5. The control device according to claim 1, wherein the first object and the fourth object are the same object.

6. The control device according to claim 1, wherein the second object and the third object are the same object.

7. The control device according to claim 1, wherein the second object and the fourth object are the same object.

8. The control device according to claim 1, wherein the third object and the first object are different objects.

9. The control device according to claim 1, wherein the fourth object and the second object are different objects.

10. The control device according to claim 1, wherein the program, when executed by the processor, further causes the control device to:
execute dividing processing of dividing the plurality of the second image-capturing devices into the first group and the second group, based on positions of each of the plurality of the second image-capturing devices.

11. The control device according to claim 10, wherein, in the dividing processing, the plurality of the second image-capturing devices are divided into the first group and the second group on the basis of at least one of relative positions between each position of the plurality of the second image-capturing devices and the fourth object, and relative positions between each position of the plurality of the second image-capturing devices and the third object.

12. The control device according to claim 10, wherein, in the dividing processing, the plurality of the second image-capturing devices are divided into the first group and the second group on the basis of at least one of distances between each position of the plurality of the second image-capturing devices and the fourth object, and distances between each position of the plurality of the second image-capturing devices and the third object.

13. The control device according to claim 10, wherein, in the dividing processing, the plurality of the second image-capturing devices are divided into the first group and the second group such that adjacent ones of the second image-capturing devices are not included in the same group.

14. The control device according to claim 10, wherein, in the dividing processing, the plurality of the second image-capturing devices are divided into the first group and the second group on the basis of positions of each of the plurality of the second image-capturing devices, regions of movement of shooting directions of each of the plurality of the second image-capturing devices, and a position of the third object.

15. The control device according to claim 10, wherein, in the dividing processing, the plurality of the second image-capturing devices are divided into the first group and the second group on the basis of positions of each of the plurality of the second image-capturing devices, regions of movement of shooting directions of each of the plurality of the second image-capturing devices, and a position of the fourth object.

16. The control device according to claim 1, wherein the program, when executed by the processor, further causes the control device to:
execute dividing processing of dividing the plurality of the second image-capturing devices into the first group and the second group, on the basis of user operations.

17. A control method, comprising:
acquiring information indicating a shooting object of a first image-capturing device; and controlling a shooting direction of a plurality of second image-capturing devices so as to face a shooting object corresponding to the shooting object of the first image-capturing device, wherein in the controlling, in a case in which a shooting direction of the first image-capturing device is changed from a direction facing a first object to a direction facing a second object, a shooting direction of image-capturing devices included in a first group, out of the plurality of the second image-capturing devices, is not changed from a direction facing a third object corresponding to the first object, and a shooting direction of image-capturing devices included in a second group, out of the plurality of the second image-capturing devices, is changed from the direction facing the third object, to a direction facing a fourth object corresponding to the second object, and in the controlling, after the shooting direction of the image-capturing devices included in the second group is changed to the direction facing the fourth object, the shooting direction of the image-capturing devices included in the first group is changed from the direction facing the third object to the direction facing the fourth object.

18. A non-transitory computer readable medium that stores a program, wherein the program causes a computer to execute a control method comprising:

acquiring information indicating a shooting object of a first image-capturing device; and controlling a shooting direction of a plurality of second image-capturing devices so as to face a shooting object corresponding to the shooting object of the first image-capturing device, wherein in the controlling, in a case in which a shooting direction of the first image-capturing device is changed from a direction facing a first object to a direction facing a second object, a shooting direction of image-capturing devices included in a first group, out of the plurality of the second image-capturing devices, is not changed from a direction facing a third object corresponding to the first object, and a shooting direction of image-capturing devices included in a second group, out of the plurality of the second image-capturing devices, is changed from the direction facing the third object, to a direction facing a fourth object corresponding to the second object, and in the controlling, after the shooting direction of the image-capturing devices included in the second group is changed to the direction facing the fourth object, the shooting direction of the image-capturing devices included in the first group is changed from the direction facing the third object to the direction facing the fourth object.

\* \* \* \* \*